(12) United States Patent
Waksul

(10) Patent No.: US 9,357,861 B2
(45) Date of Patent: Jun. 7, 2016

(54) PLATE STAND

(71) Applicant: Isaac Waksul, Long Beach, CA (US)

(72) Inventor: Isaac Waksul, Long Beach, CA (US)

( * ) Notice: Subject to any disclaimer, the term of this patent is extended or adjusted under 35 U.S.C. 154(b) by 0 days.

(21) Appl. No.: 14/718,081

(22) Filed: May 21, 2015

(65) Prior Publication Data
US 2015/0250335 A1   Sep. 10, 2015

Related U.S. Application Data

(63) Continuation of application No. 14/470,878, filed on Aug. 27, 2014, now Pat. No. 9,089,231, which is a continuation of application No. 13/946,769, filed on Jul. 19, 2013, now Pat. No. 8,844,733, which is a continuation of application No. 13/134,636, filed on Jun. 13, 2011, now Pat. No. 8,540,084, which is a continuation of application No. 13/065,175, filed on Mar. 16, 2011, now Pat. No. 8,540,083.

(60) Provisional application No. 61/341,874, filed on Apr. 6, 2010.

(51) Int. Cl.
| A47F 10/06 | (2006.01) |
|---|---|
| A47G 19/08 | (2006.01) |
| A47B 81/04 | (2006.01) |
| A47J 47/16 | (2006.01) |
| A47F 7/00 | (2006.01) |
| A47B 43/00 | (2006.01) |

(52) U.S. Cl.
CPC ............... *A47F 10/06* (2013.01); *A47B 81/04* (2013.01); *A47F 7/0007* (2013.01); *A47F 7/0064* (2013.01); *A47F 7/0071* (2013.01); *A47G 19/08* (2013.01); *A47J 47/16* (2013.01); *A47B 43/00* (2013.01); *A47B 2230/0085* (2013.01)

(58) Field of Classification Search
CPC ...... A47B 55/02; A47B 73/002; A47B 81/04; A47B 43/00; A47B 2230/0085; A47G 19/08; A47J 47/16; A47L 19/04; A47F 1/082; A47F 10/06; A47F 7/0007; A47F 7/0064; A47F 7/0071
USPC ............ 211/40, 41.12, 41.2, 41.3, 41.4, 41.5, 211/41.6, 41.7, 45, 50, 85.31, 85.4, 120, 211/133.1, 133.2, 133.3, 133.5, 181.1; 248/153, 175, 465.1
See application file for complete search history.

(56) References Cited

U.S. PATENT DOCUMENTS

| 152,550 | A | 6/1874 | Collins |
|---|---|---|---|
| 439,569 | A | 10/1890 | Ahrens |
| 481,404 | A | 8/1892 | Jesser |
| 563,562 | A | 7/1896 | Burns |
| 601,753 | A | 4/1898 | Kaiser |
| 680,450 | A | 8/1901 | Aiken |
| 895,016 | A | 8/1908 | Herrmann |
| 953,007 | A | 3/1910 | Haller |
| 995,120 | A | 6/1911 | Cooper |

(Continued)

*Primary Examiner* — Joshua Rodden
(74) *Attorney, Agent, or Firm* — Donald J. Ersler

(57) ABSTRACT

A dish assembly includes a pair of folding panels having a preset angular relationship, the panels also including plate holding unit structures that are linearly offset along the rising extent of the structure, for greater single object support stability. The panels are hinged at one or more points more closely adjacent lateral support structure on adjacent the plate holding unit structure openings. The panels fold for flat storage, or open to form a stable angled structure with the angular degree of open deployment stabilized by any method, including a limiting hinge, a guide base, or other structure.

16 Claims, 26 Drawing Sheets

(56) References Cited

U.S. PATENT DOCUMENTS

| | | |
|---|---|---|
| 1,060,431 A | 5/1913 | West |
| 1,091,026 A | 3/1914 | Traugot |
| 1,093,450 A | 4/1914 | McLaughlin |
| 1,334,545 A | 3/1920 | Londelius |
| 1,379,379 A | 3/1921 | AbrahmsenHerman |
| D75,828 S | 7/1928 | Canfield |
| 1,822,087 A | 9/1931 | Feingold |
| 1,888,141 A | 11/1932 | Orth |
| 2,051,093 A | 8/1936 | Nathan |
| 2,087,237 A | 7/1937 | Erhardt |
| 2,313,620 A | 3/1943 | Brunner |
| D164,503 S | 9/1951 | Kerr |
| D176,818 S | 1/1956 | Robinson |
| 2,865,545 A | 12/1958 | Small |
| 2,905,332 A | 9/1959 | Myers |
| 2,946,452 A | 7/1960 | Calioero |
| 2,958,424 A | 11/1960 | Bigatti |
| 3,039,618 A | 6/1962 | Gabriel |
| 3,040,881 A | 8/1962 | Mcneill |
| 3,288,304 A | 11/1966 | Graves |
| 3,294,244 A | 12/1966 | Laughlin |
| D218,816 S | 9/1970 | Leaver |
| 3,655,063 A | 4/1972 | Landry |
| 3,825,216 A | 7/1974 | Rodvien |
| 4,221,299 A | 9/1980 | Taylor |
| 4,330,065 A | 5/1982 | Haddad |
| 4,338,866 A | 7/1982 | Streit |
| D272,944 S | 3/1984 | Coughlin |
| 4,618,115 A | 10/1986 | Belokin |
| 4,691,832 A | 9/1987 | Steiger |
| 4,757,906 A | 7/1988 | Ovitz |
| 4,787,522 A | 11/1988 | Nocek |
| 4,911,308 A | 3/1990 | Nylund |
| D319,361 S | 8/1991 | Moser |
| 5,064,236 A | 11/1991 | Stanfield |
| 5,088,605 A | 2/1992 | Nales |
| D329,563 S | 9/1992 | Rasmussen |
| 5,195,642 A | 3/1993 | Dardashi |
| 5,301,819 A | 4/1994 | Moeken |
| 5,450,967 A | 9/1995 | Mallory |
| D362,776 S | 10/1995 | Thorn |
| 5,538,145 A | 7/1996 | Held |
| 5,542,731 A | 8/1996 | Wills |
| 5,836,458 A | 11/1998 | Nales |
| D405,300 S | 2/1999 | Regan |
| 5,944,200 A | 8/1999 | Nales |
| 6,070,743 A | 6/2000 | Hsueh |
| D444,020 S | 6/2001 | Muth |
| 6,269,961 B1 | 8/2001 | Porcelli |
| 6,749,208 B2 | 6/2004 | Orozco |
| D543,078 S | 5/2007 | Davalos |
| 7,520,550 B2 | 4/2009 | Lord |
| D601,841 S | 10/2009 | Neufeld |
| 7,886,917 B1 | 2/2011 | Berger |
| D651,025 S | 12/2011 | Roth |
| 8,186,524 B2 | 5/2012 | Siapush |
| 8,573,410 B2 | 11/2013 | Chalifoux |
| 2004/0159759 A1 | 8/2004 | Schultz |
| 2008/0237169 A1 | 10/2008 | May |
| 2009/0195005 A1 | 8/2009 | Lord |
| 2013/0105423 A1 | 5/2013 | Chalifoux |

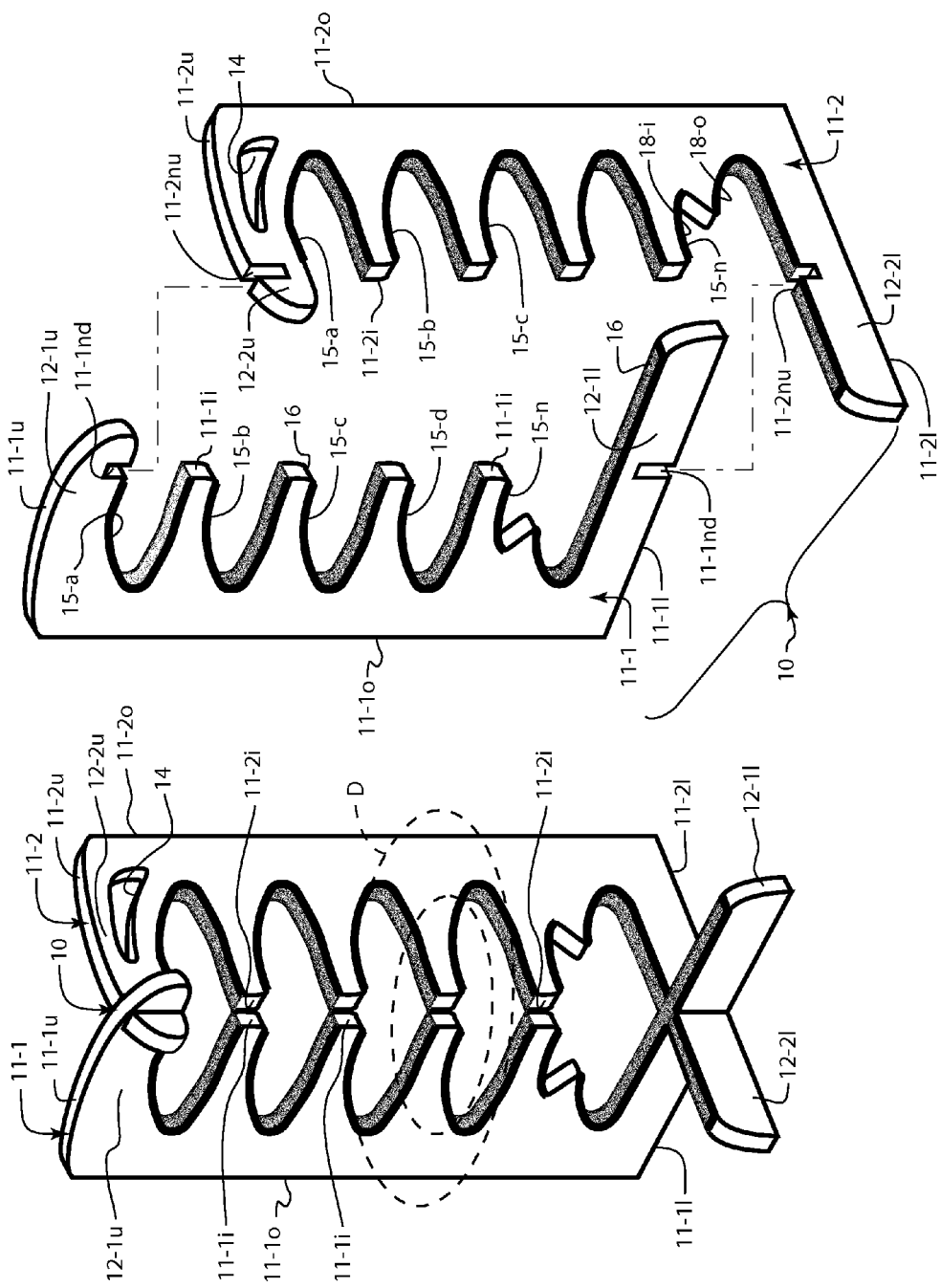

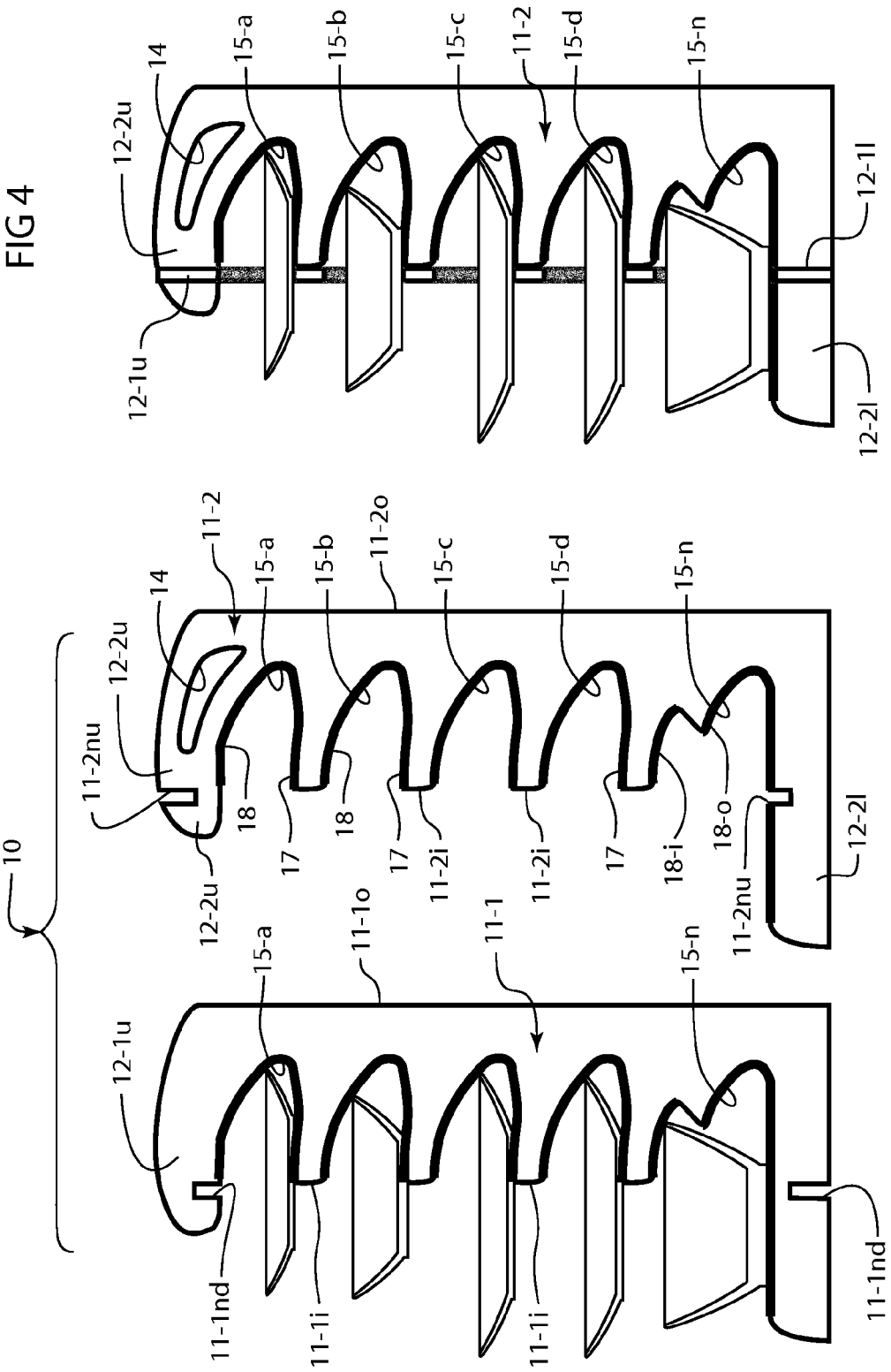

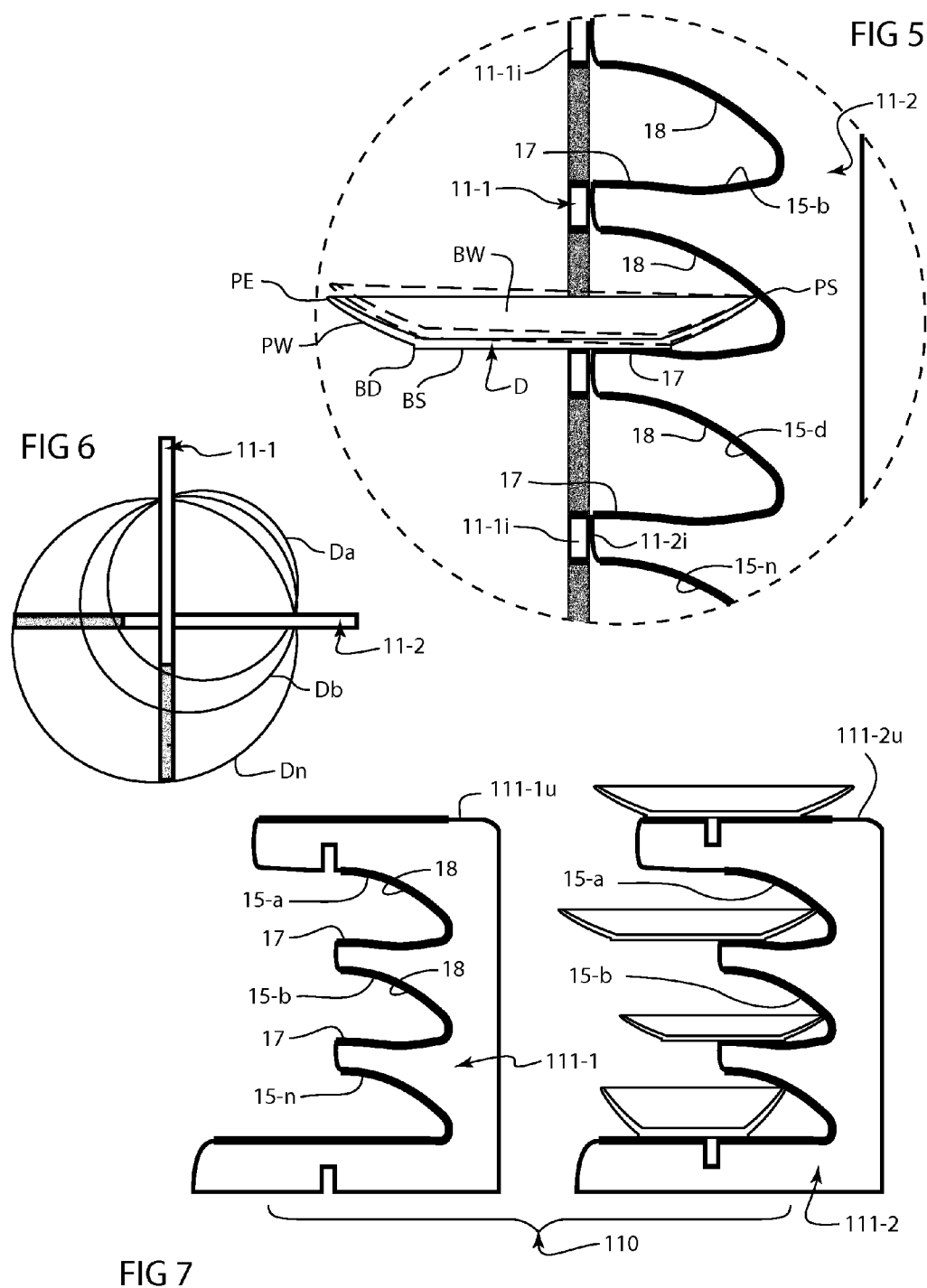

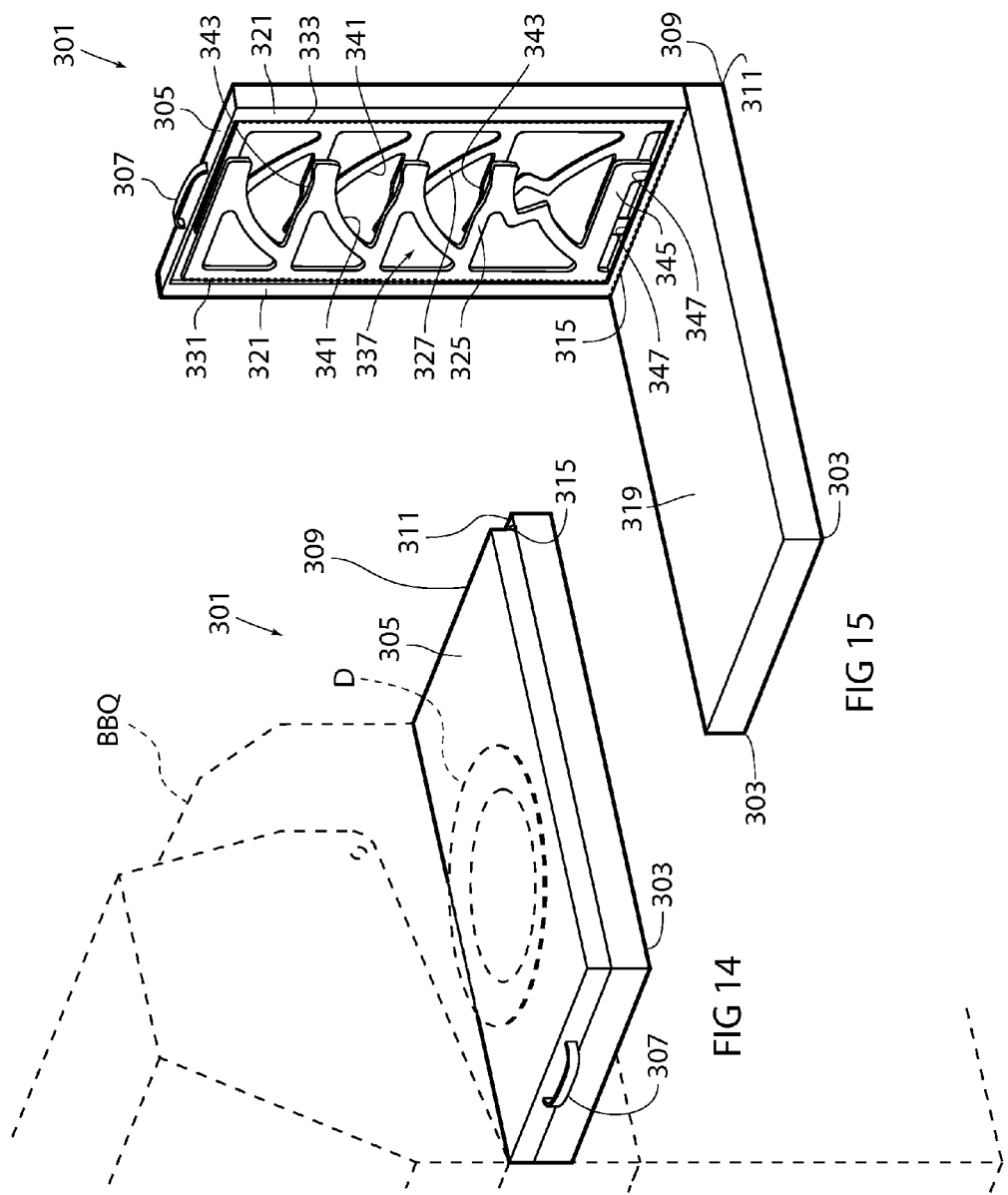

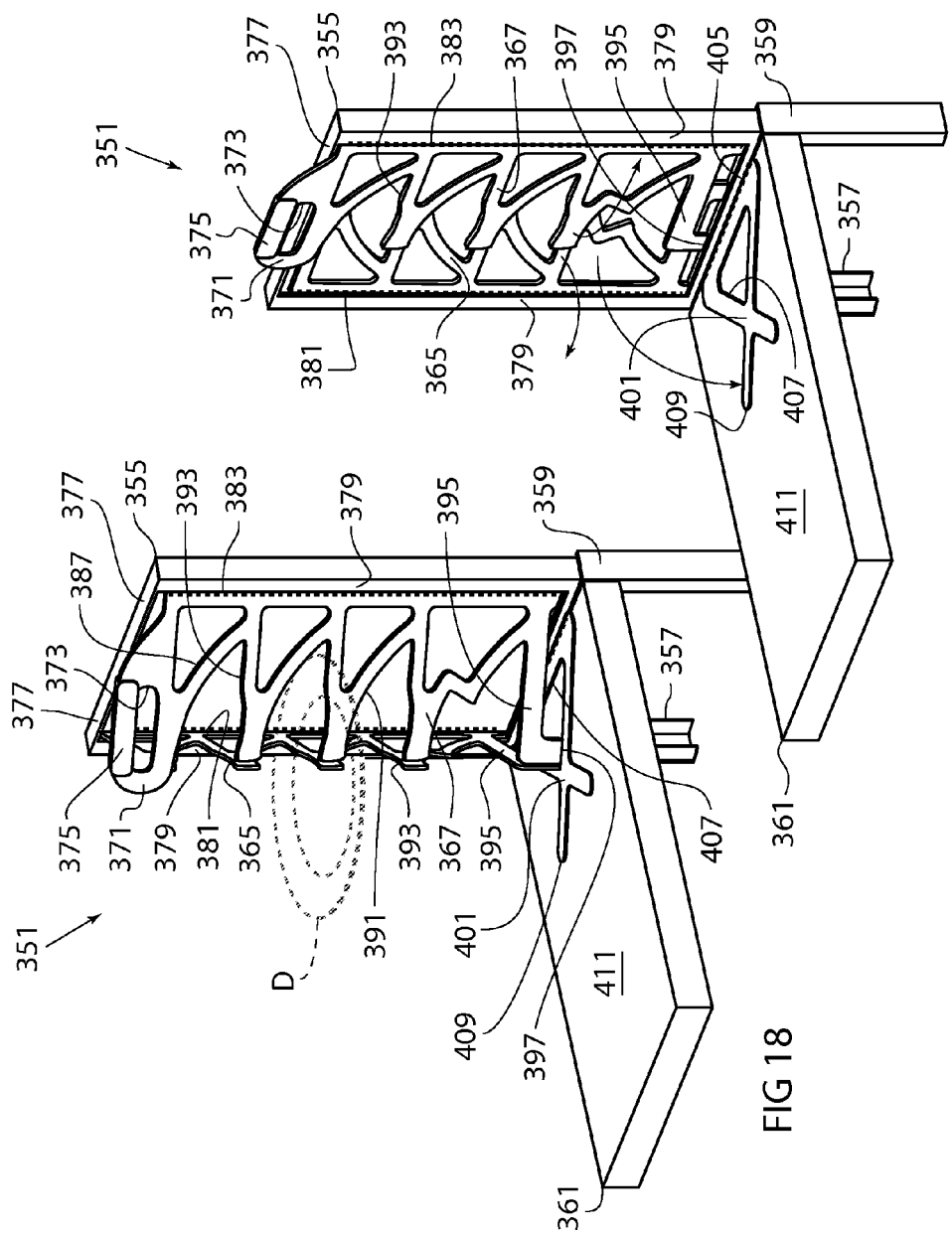

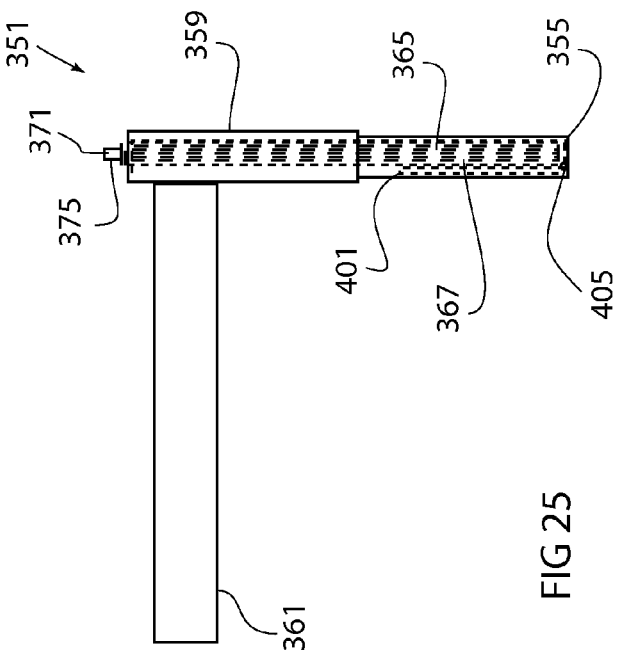
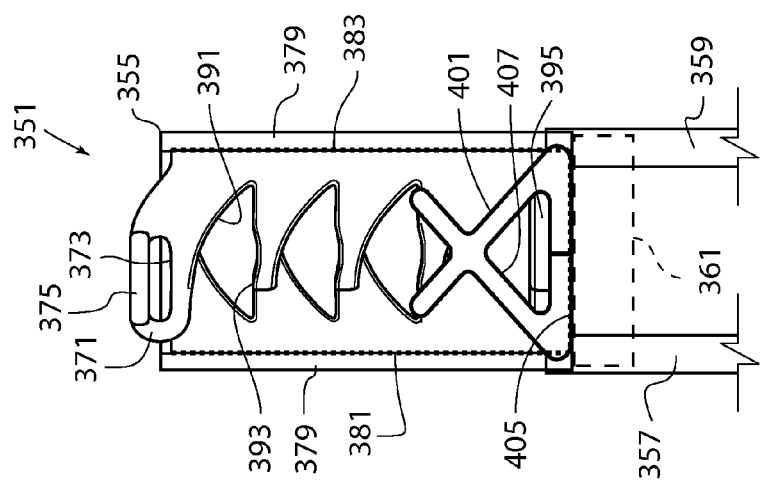
FIG 25
FIG 24

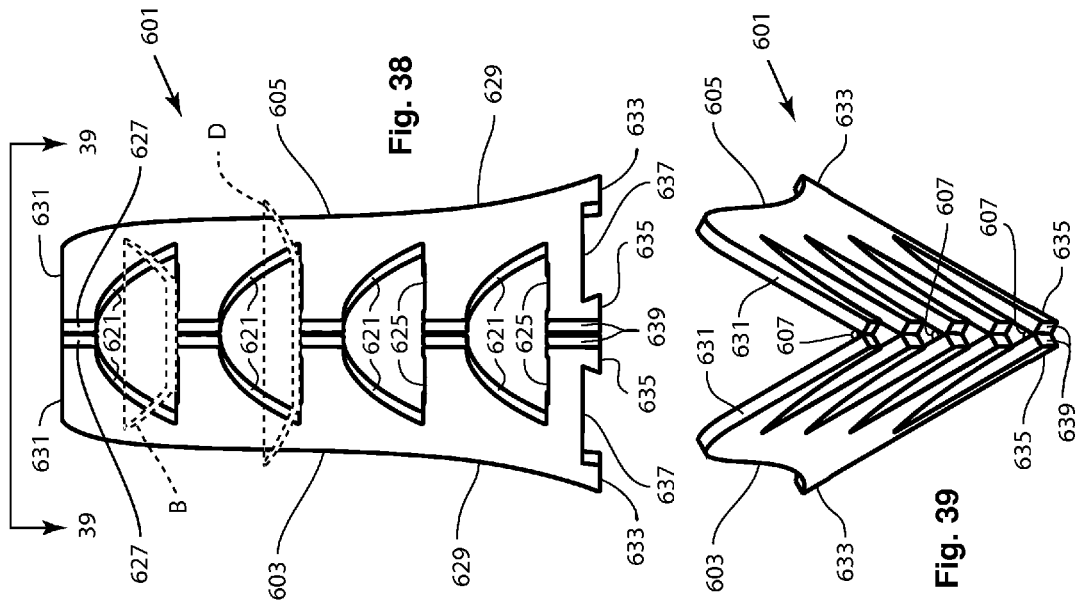
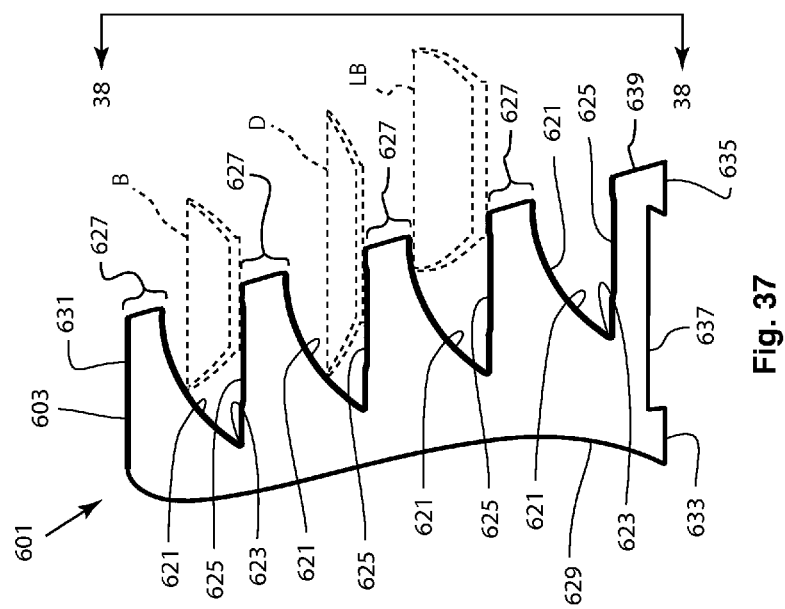

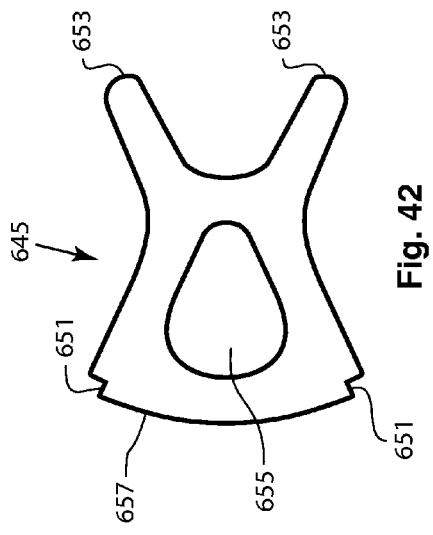
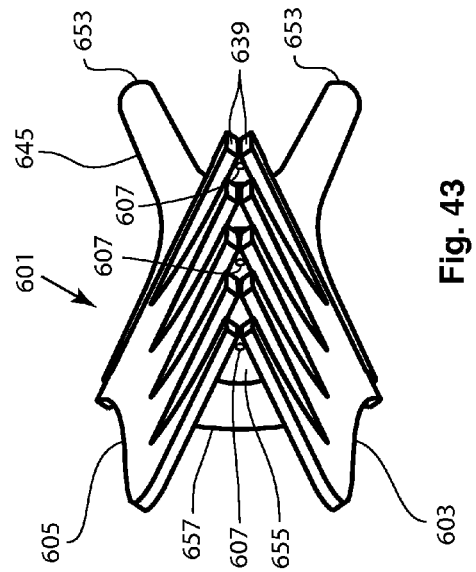
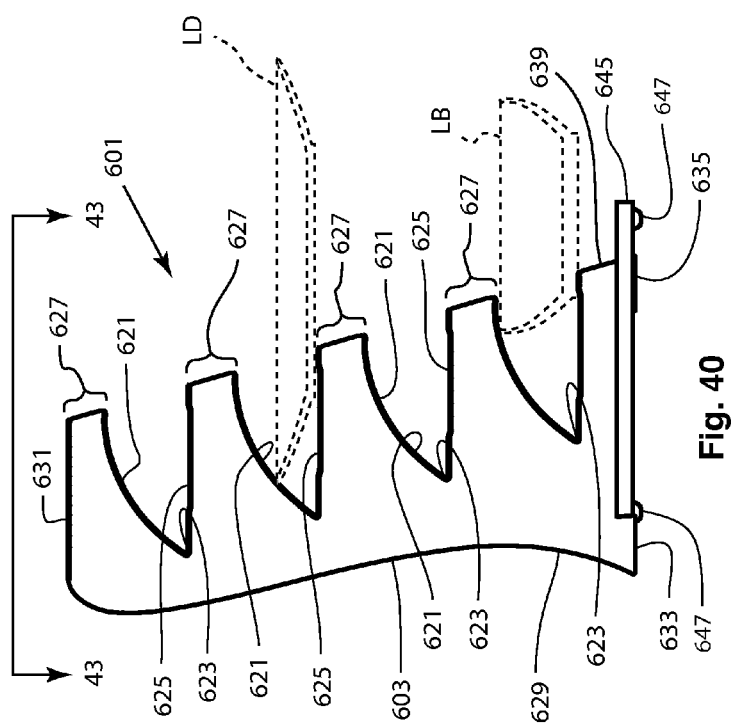
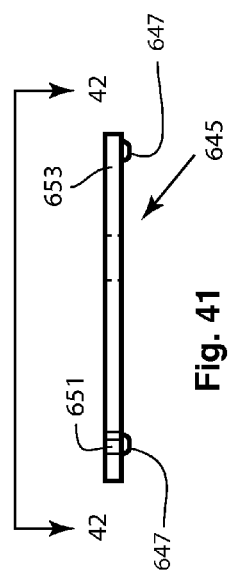

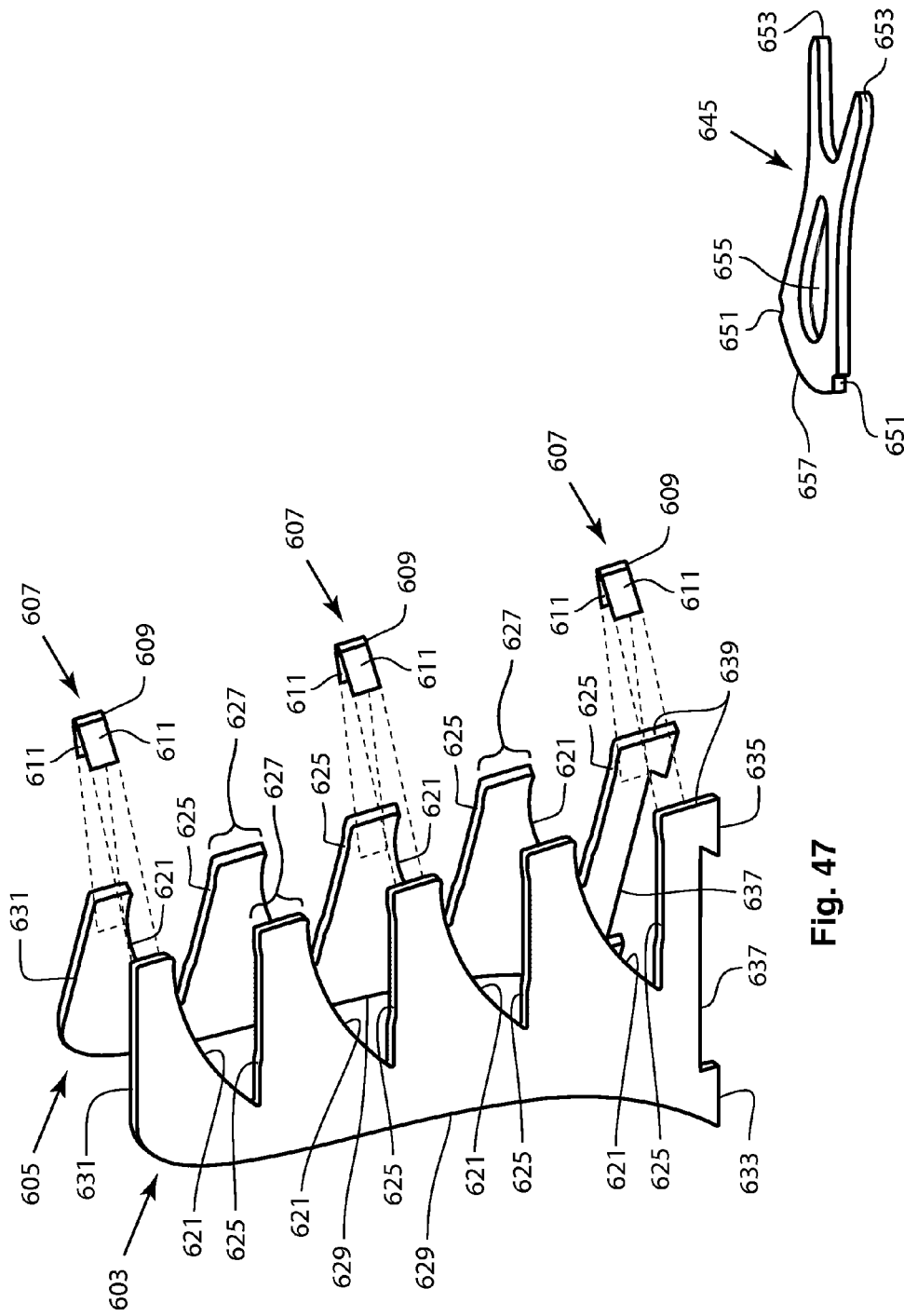

PLATE STAND

REFERENCE TO RELATED APPLICATIONS

This application is a continuation-in-part of U.S. patent application Ser. No. 14/470,878 filed on Aug. 27, 2014, which was a continuation-in-part of U.S. patent application Ser. No. 13/946,769 filed on Jul. 19, 2013, which was a continuation-in-part of U.S. patent application Ser. No. 13/134,636 filed on Jun. 13, 2011, which, in turn is a continuation-in-part of U.S. patent application Ser. No. 13/065,175 filed on Mar. 16, 2011, which, in turn, obtains the benefit of the earlier filing date of U.S. Provisional Patent Application No. 61/341,874 filed on Apr. 6, 2010, and the benefit of these earlier dates is claimed for all matter common therewith.

BACKGROUND OF THE INVENTION

1. Field of the Invention

The present invention relates to dish carriers, and more particularly to various structures which may include a plurality of panel members cooperating with each other for supporting arrays of dishes both in the course of their delivery and also as a stationary support in a cantilevered fashion meaning substantially horizontal to direction of gravity, with "dishes" being a generic term for foodware such as bakeware & cookware, bowls, plates, platters and dishes, and the like.

2. Description of the Prior Art

Those engaged in preparing and serving food for consumption by others have consistently faced the burdens an array of dishes this service entails, particularly when more than one person is being served a full meal at a dining table. In commercial settings this burdensome task has been partly assisted by large carrying trays that were then placed either on any adjacent vacant table, or more frequently, on collapsible stands temporarily erected next to the table being served. The manipulative difficulty of a large tray on its fully loaded path from the kitchen has nonetheless become legendary, even providing endless comedic sequences in many of our films, and various mechanical alternatives were therefore devised to assist the overburdened food service provider.

These earlier assisting mechanical alternatives fall generally into three groupings of dish carrier assemblies that also serve as a stand, the first arranged as a cage within which the dishes are suspended by their edges or arranged as a stack, exemplified by the teachings of U.S. Pat. No. 5,064,236 to Stanfield; U.S. Pat. No. 5,542,731 to Wills; and others; the second in which dish supporting trays, supports or shelves are cantilevered from a common axis that is provided with a support base, as in U.S. Pat. No. 953,007 to Haller; U.S. Pat. No. 4,911,308 to Nylund; U.S. Pat. No. 6,749,208 to Orozco et el.; and others; and the third in which the peripheral edge of each dish is captured in cantilever within exteriorly directed notch structures around a common carrying axis that also serves as a support base, as in U.S. Pat. Nos. 5,088,605, 5,836,458 and 5,944,200 all to Nales; U.S. Pat. No. 7,520,550 and US publication 2009/0195005 to and by Lord; and many others.

Each of the foregoing, while suitable for the purposes intended, either entails a complex, costly and often cumbersome structure, as exemplified by those in the first two groupings, or the simpler, but more precariously suspended and therefore difficult to manipulate, carrying arrangement in which the engaged dish peripheries are relied on to carry the whole plate loading. Both these modalities are particularly bothersome in a busy restaurant setting and a simply constructed dish carrying arrangement that obtains the benefits and deployment convenience of the cantilevering dish edge capture, but in a more stable and redundant form, is therefore extensively desired and it is one such arrangement that is disclosed herein.

SUMMARY OF THE INVENTION

Accordingly, it is the general purpose and object of the present invention to provide a simply assembled dish carrying structure in which the carried food laden dishes are resiliently retained in a cantilevered manner by engagement at varying levels of insertion.

Other objects of the invention are to provide a dish carrying assembly which is easily separated into conveniently stored panels.

Yet further and additional objects of the invention shall become apparent upon the examination of the description that follows in conjunction with the illustrations appended hereto.

Briefly, these and other objects are accomplished within the present invention, in accordance with a first mode of implementation thereof, by providing a pair of generally similar orthogonally interlocking structures each defined as a vertically elongate rectangular panel provided at the top and bottom edges with corresponding co-planar upper and lower lateral extensions each notched by opposingly aligned transverse grooves conformed for crossed mating receipt within each other. Once thus interlocked the resulting crossed structural combination then provides the necessary three dimensional engagement which can either serve as a stand or as a carrying assembly which may be facilitated by forming a handle in the panel that is provided with the upwardly open interlocking grooves.

The panel edges between the lateral extensions are each provided with matching cut-outs each covered with a resilient edge covering and each shaped so that in their crossing interlocked combination conformingly matched edge recesses are provided in which correspondingly shaped peripheral portions of dishes are receivable for a resiliently effected cantilever moment capture of the dish. In this manner various dish shapes may conveniently accommodated by the simple expedient of the cut-out shape, reducing fabrication costs and the need for specialized inventory. Of course, the planar nature of the two main components of this inventive assembly, and also their similar planforms, provide both manufacturing and great storage convenience when not in use.

In accordance with a second mode of implementation of the invention herein the engagement between the panels may be modified to include hinges in lieu of the interlocking grooves so that each cooperative panel pair is fixed in a hinged relationship, with the free edges of a hinged panel pair, in turn, hinged to the free edges of yet another hinged panel pair. Similar to the first implementation mode, the adjacent edges of each hinged panel pair include the above matched edge recesses shaped to receive in a cantilevered manner the suspension of variously sized dishes, thus effectively doubling carrying capacity. In this hinged form the assembly may be once again collapsed for storage in an overlying panel stack from which it can be expanded into a three-dimensional form when needed to support or carry dishes. A telescoping tubular handle assembly extending between the upper hinges joining the recessed edges of each panel pair is then utilized to provide manual carrying convenience, the telescoping collapse of the handle assembly deploying the panel stack into its three-dimensional form for supporting dishes with the inherent flexure of the telescoped handle when used to lift the assembly insuring the retention of this three dimensional form in the course of its movement.

In accordance with a third mode of implementation of the invention herein the engagement between the panels may be set to depend from a third body which can support the panels and also facilitate a pivotal movement between a stable supported deployed position and a stable, compact stowed position. The pivoting panels can be supported inside a pivot support which may or may not have a box structure of sufficient depth that the pivoting panels can be stowed within the depth of the box structure. In one embodiment, the stowed panels and box structure can itself be pivotally attached to another structure, portable or fixed, so that the box structure can be pivotally moved to achieve a generally vertical position from which the panels can be pivotably deployed. The panels themselves can provide the structural support against a closing force from the box structure and the panels may engage a stable surface which may or may not be a part of the structure form a structure from which the box structure is pivotally deployed. After use, the panels are pivoted to a position within the box support, and the box support can be brought to a closed position to enable the panels to be both stored and hidden when not in use.

Also in accordance with a third mode of implementation of the invention herein the panels may be set to depend from a third body which is set to slidably deploy from a stowed position to a deployed position. The third body may or may not be box shaped since the slidable deployment will generally cause the third body and panels to drop below a position from which they may be seen and into a stowage position perhaps with only a top member and a deployment handle being observable while the third body is in the stowed position. A bracket having the ability to support the third body in its vertical displacement between a completely stored position and a ready-to-be deployed position may range at most from a blind rectangular pocket to a least a pair of "U" shaped bracket supports, depending upon the needs of the structures which surround the support system. From a stowed position, the third body is vertically displaced sufficiently for the panels to be pivoted to a deployed position. It may be preferable for the panels deployment to engage a stable surface to secure the third body from vertical displacement back to its stowed position, as well as to use that same engagement to support plates.

A fourth mode of implementation of the inventive dish assembly of the invention includes a pair of folding panels that also includes plate holding unit structures that are linearly offset along the rising extent of the structure, for greater single object support stability. The panels are hinged at one or more points more closely adjacent lateral support structure on adjacent the plate holding unit structure openings. The panels fold for flat storage, or open to form a stable angled structure with the angular degree of open deployment stabilized by any method, including a limiting hinge, a guide base, or other structure.

The general geometric principles upon which all of the modes of implementation shown are also discussed in detail. An opening for providing support to a plate has a lateral view seen somewhat as a slot. The lateral view of the slot, typically carried by two panels, is seen as having an arc shaped upper engagement surface opposed by a generally horizontal lower engagement surface somewhat oriented as chord taken with respect to the arc. It is expected that variations can occur at the mouth or opening of the slot and at the distal end of the slot, which include aesthetic variations, auxiliary structure variations, and limitations of materials or manufacture.

Thus in both forms an easily stored structural combination is obtained which can be rendered in any convenient material structures and which, by the shaping convenience of the edge capturing recesses, can include multiple geometric shapings to capture in a cantilevered manner the edges of various dish forms so that inadvertent dropping of the dishes received therein is effectively precluded.

BRIEF DESCRIPTION OF THE DRAWINGS

FIG. 1 is a perspective illustration of a first embodiment of the inventive dish carrying structural assembly in its interlocked and deployed form;

FIG. 2 is a perspective illustration of a first embodiment of the inventive dish carrying structural assembly shown in FIG. 1 separated by its parts;

FIG. 3 is a plan view, again separated by parts, of the inventive dish carrying structural assembly shown in FIG. 1;

FIG. 4 is a side view of the inventive dish carrying structural assembly shown in FIG. 2;

FIG. 5 is a side view detail of one portion of the inventive dish carrying shown in FIGS. 1-4;

FIG. 6 is a diagrammatic top view illustrating the various dish alignments in various cantilevered manner the supportive captures rendered possible within the capturing recesses provided within the inventive dish carrier structural assembly;

FIG. 7 is yet another side view, separated by parts, of a reduced form of the inventive dish supporting structural assembly shown in FIGS. 1-6;

FIG. 14 is a perspective view of a first version of a third implementation of the inventive dish support assembly where a third structural member pivotally supports a pair of panels, the third structural member seen in stowed position adjacent a barbeque side shelf, grill table or the like shown in broken line format.

FIG. 15 is a perspective view of the first version of the third implementation of the inventive dish support assembly of FIG. 14 and shown with the third structural member in an open intermediate position between a stowed position and a deployed position and illustrating the pair of panels in the collapsed, stowed position;

FIG. 18 is a perspective view of a second version of a third implementation of the inventive dish support assembly where a third structural member is supported to vertically lift from a rearwardly mounted bracket and deploy on an adjacent surface, and shown in the fully deployed position adjacent a barbeque (BBQ) side shelf or the like;

FIG. 19 is a perspective view of the second version of the third implementation of the inventive dish support assembly of FIG. 18 and shown with the third structural member in an open intermediate position between a stowed position and a deployed position and illustrating the pair of panels in the collapsed, stowed position with a base support panel, that may be optionally shown in a position generally mid-way between stowage and deployment;

FIG. 24 is a front plan view taken perspective view of the second version of the third implementation of the inventive dish support assembly 351 of FIGS. 18-23 is shown, but corresponding more nearly to the position seen in FIG. 19, and illustrates the pivoting support in its raised position;

FIG. 25 a right side view of the second version of the third implementation of the inventive dish support assembly 351 of FIGS. 18-24 is shown, but corresponding more nearly to the position seen in FIG. 21, and illustrates the compactness of the pivoting panel components and pivoting support;

FIG. 37 is side view of the assembled dish assembly whose component parts were seen in FIGS. 35 & 36, and illustrates a view looking perpendicular to a middle plane between the first and second panels such that only the first panel is visible, and is shown with examples of various dishes and plates shown in broken line format in a position supported by the assembled dish assembly generally horizontally;

FIG. 38 is front plan view of the assembled dish assembly of FIGS. 35-37 and particularly looking into the midline plane of the assembled dish assembly of FIG. 37 along line 38-38 of FIG. 37 and illustrates the forward structure to which various dishes and plates shown in broken line format approach.

FIG. 39 is top view looking down onto the assembled dish assembly of FIGS. 35-38 and particularly looking down along line 39-39 of FIG. 38 and illustrates the tilted corner, or inclined edge, similar to a pyramidal section, formed by the adjacent series of the abbreviated vertical portions seen in FIG. 35; and seen without the various dishes and plates for greater clarity;

FIG. 40 is a side view of the assembled dish assembly similar to that seen in FIG. 37, but shown engaged with a guide and support platform which both further reinforces the angle of the first and second panels and the overall stability support of the assembled dish assembly;

FIG. 41 is a side view of the a guide and support platform seen in FIG. 40 and that illustrates the low profile of the a guide and support platform standing alone;

FIG. 42 is a top view of the guide and support platform seen in FIGS. 40 & 41 and that illustrates a central aperture;

FIG. 43 is top view looking down onto the assembled dish assembly of FIGS. 35-40 and particularly looking down along line 43-43 of FIG. 40 and illustrates the tilted corner, similar to a pyrimidal section, formed by the adjacent series of the abbreviated vertical portions, and is seen overlying the guide and support platform and illustrating its stabilizing support;

FIG. 47 is an upper perspective exploded view of the assembled dish assembly most similar to the perspective of FIG. 45 and illustrating the angular tilt of the hinges; and FIG. 48 is an upper perspective view of the guide and support platform seen in FIGS. 40-43 & 46.

DESCRIPTION OF THE PREFERRED EMBODIMENTS

Figure 8:
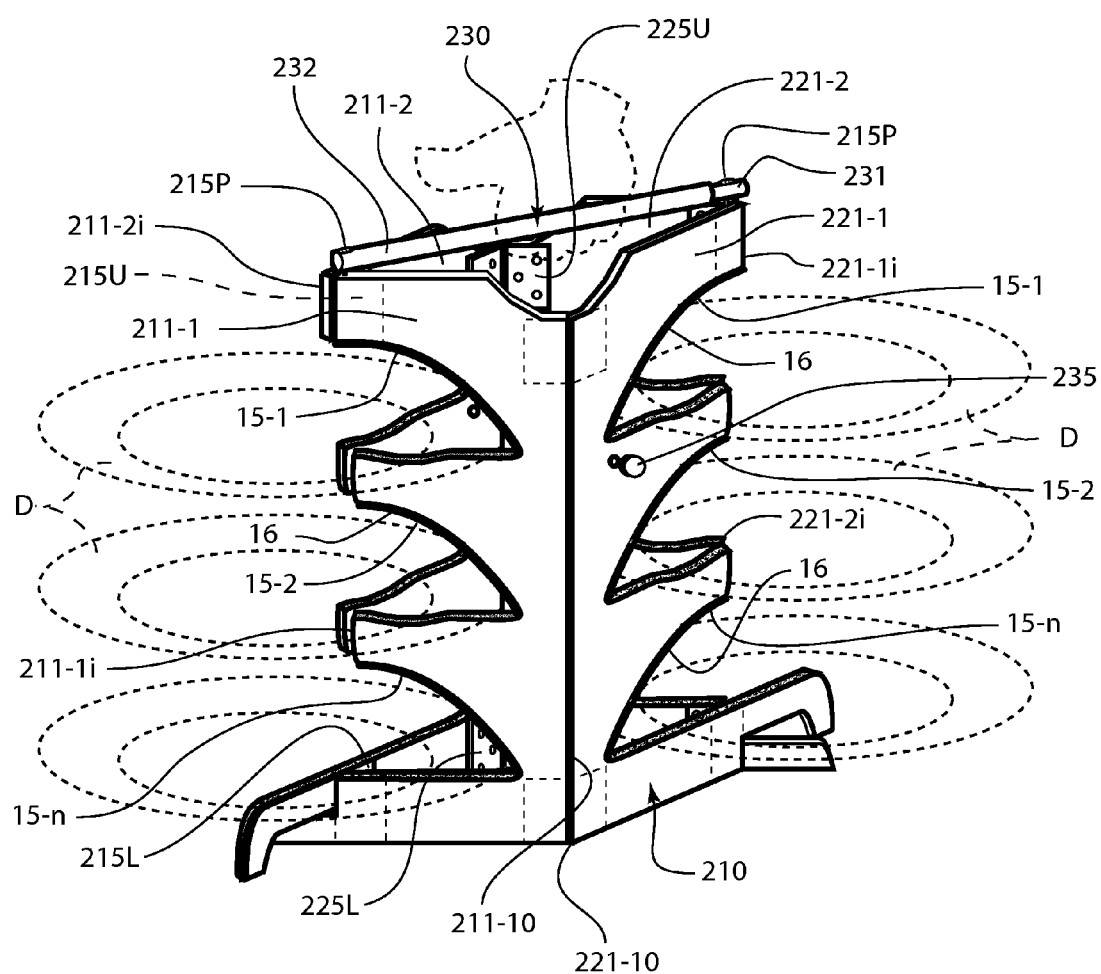
FIG. 8 is yet another perspective illustration of a second implementation of the inventive dish carrying assembly conformed as an integrated combination of a plurality of the inventive panel combinations hinged to each other.
Figure 9:
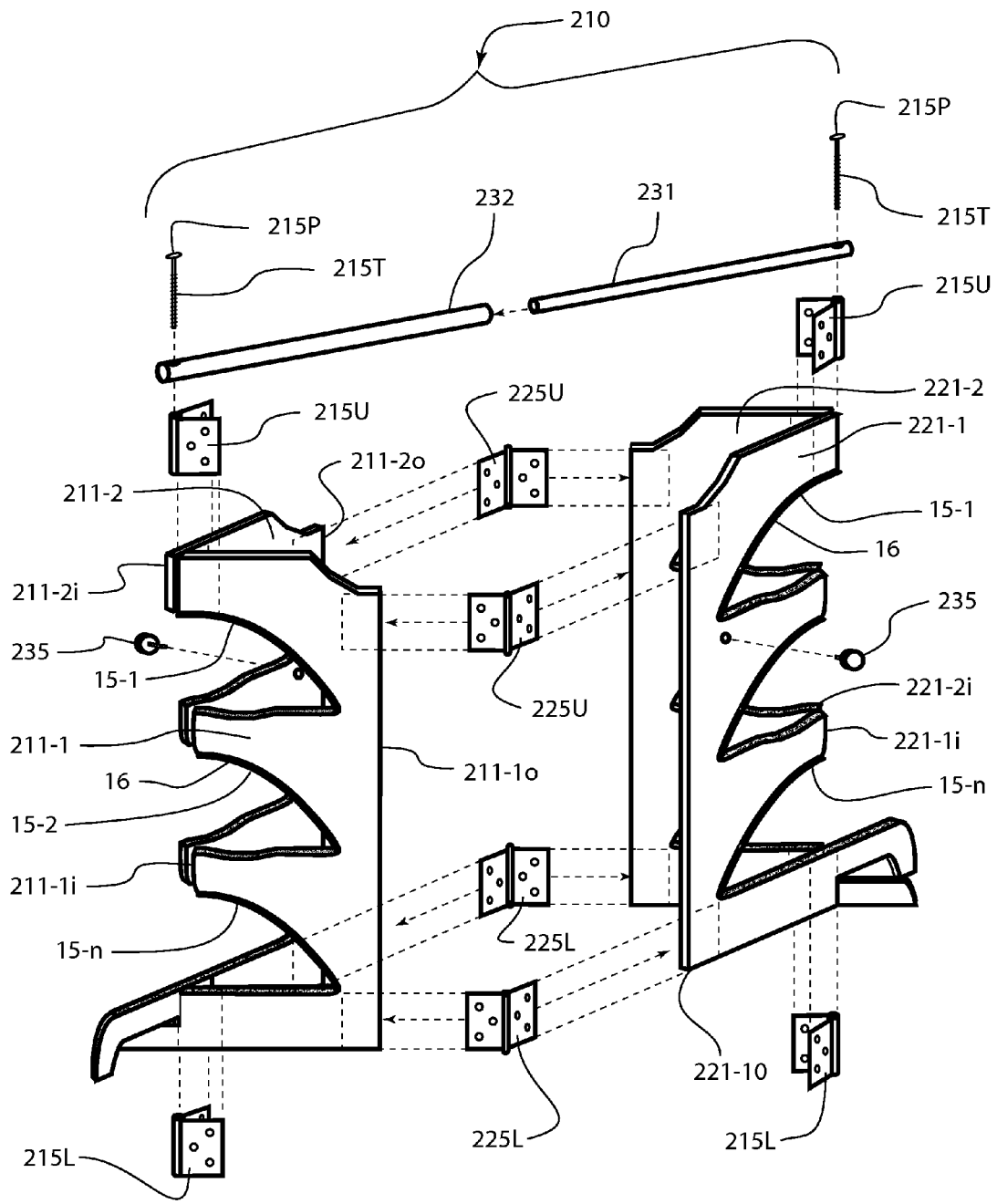
FIG. 9 is a further perspective illustration, separated by parts, of the second inventive implementation shown in FIG. 8.
Figure 11:
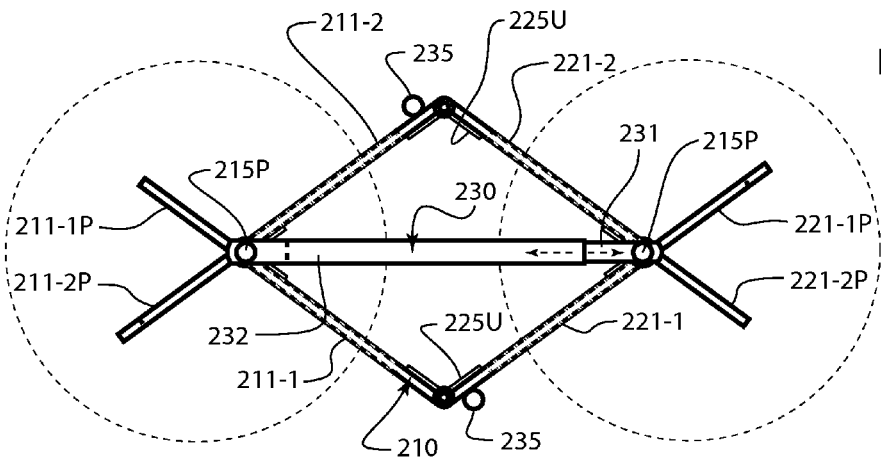
FIG. 11 is a top view of the deployed dish carrying assembly shown in FIGS. 8-10.

As shown in FIGS. 1-6 the first implementation of the inventive dish carrier assembly, generally designated by the numeral 10, comprises a pair of substantially similar generally planar panels which by their substantial similarity shall be designated herein by the trailing numerals 1 and 2, where the respective panels 11-1 and 11-2 are each of an elongate, generally rectangular planform respectively defined by inner and outer longitudinal edges 11-1$i$ and 11-1$o$ and 11-2$i$ and 11-2$o$. Transversely an upper and a lower edge 11-1$u$ and 11-1$l$ and 11-2$u$ and 11-2$l$ limit the planform of the respective panels 11-1 and 11-2, each of the upper and lower edges extending beyond the corresponding inner edges 11-1$i$ and 11-2$i$ to continue as the exterior edges of corresponding upper and a lower planar extensions 12-1$u$ and 12-1$l$ and 12-2$u$ and 12-2$l$, with the lower extensions 12-1$l$ and 12-2$l$ on each panel being greater in width and spanning further from the corresponding inner edges 11-1$i$ and 11-2$i$ than the upper extensions 12-1$u$ and 12-2$u$.

To effect an interlock between the panels the interior edge of the upper extensions of panel 11-1, immediately proximate its inner edge 11-1$i$, is transversely notched by an downwardly open notch 11-1$nd$ with a conformingly similar, but upwardly directed, transverse notch 11-2$nu$ formed in the corresponding upper edge 11-2$u$ of panel 11-2 with a similar, opposingly directed, set of conforming notches 11-1$nd$ and 12-2$nu$ formed in the lower inner edge of the extension 12-1$l$ and the lower extension 12-2$l$. These last opposing notches, and also the corresponding extensions in which they are formed, are each somewhat deeper, and correspondingly also wider in their planform, in order to simplify and render convenient their sequential engagement to interlock the panels 11-1 and 11-2 in a crossed relationship.

In this interlocked configuration the inner edges 11-1$i$ and 11-2$i$ align in a closely adjacent, but substantially orthogonal, relationship with the crosswise engaged lower extensions 12-1$l$ and 12-2$l$ forming a supporting base for this interlocked panel combination. A handle 14 formed in the upper extension 12-2$u$ of panel 11-2 is then useful to lift the engaged panel combination from ground to serve as a conveniently assembled, and also conveniently disassembled and stored, carrier structure for dishes D that are suspended in cantilever from a set of matching panel recesses 15-$a$ through 15-$n$ that are formed in each of the panels in the form of mutually aligned cut-outs from the inner edges 11-1$i$ and 11-2$i$ into the corresponding panel and to assure a secure cantilevered engagement a resilient strip 16, such as an adhesively attachable foam rubber strip, is applied to each of the edges of the recesses 15-$a$ through 15-$n$.

Those skilled in the art will appreciate that the foregoing structure is directed for use in settings where a large number of dishes need to be handled. Of course, such settings rarely involve dishes that are each an 'object d'art', i.e., a precious, extremely fragile artistic piece, but dishes D that are appropriately designed with correct contemplation for strength of materials, the sanitary aspects of the finish, mass density and the like. Simply, dishes appropriately designed for convenient handling with appropriate attention to notions like scaling laws and commercially expedient materials are those that need the handling assistance disclosed herein. These typically include a fairly large circular base with a well defined base edge circle BD supporting the bowl BW surrounded by a peripheral wall PW which either extends upwardly for those dishes that convey fluid foods or that projects generally radially to form a peripheral surface PS. In virtually all instances, however, there is a well-defined, flat, circular bottom surface BS surrounded by a peripheral edge PE that is either substantially above the bottom surface BS or close to the plane thereof.

These attributes are successfully used to advantage in the edge shaping of each of the recesses 15$a$ through 15$n$ by providing a convex curvature, or bulge, 17 in the bottom portion of the recess edge with a complementary conforming, but radially further from the inner edges 11-1$i$ or 11-2$i$, upper edge arc segment 18 that is generally spaced from the convex curvature 17 by a radial and vertical gap similar to the gap between the base surface BS and the peripheral edge PE of the particular dish configuration that is to be received in the recess. Since this geometric relationship provides a generally fixed distance between the fulcrum point supporting the base surface BS on the convex curvature 17 and the opposing contact point between the peripheral edge PE at the complementary arc segment 18 in each of the panels 11-1 and 11-2 the resulting cantilevered engagement accommodates substantial misalignments of the dish D while still maintaining moment levels of the cantilevered suspension that is within the material strength capacity of the dish D.

Thus each of the recesses 15$a$ through 15$d$ can be conformed to accept a particular family of dishes, assuring in each instance a self-correcting shift in the fulcrum contact between the dish bottom surface BS and the curvature 17 which occurs within the recesses in both panels 11-1 and 11-2, compensating for a wide range of misalignments in the handling of the dish. Moreover, where the number of recesses is insufficient for the dish variety used the upper arc segment 18 may be segmented as illustrated by the recess 15$n$ where a substantially higher inner arc segment 18-I extends partly into the recess to accommodate dishes that have a substantial peripheral wall PW while the remaining outer portion 18-$o$ then drops to a closer spacing to accommodate flat dishes characterized by a substantial peripheral edge PE that, of course, requires deeper insertion.

In this manner all sorts of complementing dish configurations can be easily accommodated in a structure that is inexpensive to produce, easily disassembled and stored and conveniently used. The simple planar nature of all the interlocking components of the present invention assures all the foregoing benefits including the packaging convenience benefit when accompanying a sale of complementing dishes. Moreover, as illustrated in FIG. 6 the crossed interlocking of the panels 11-1 and 11-2 results in an accommodating cantilevered capture at various degrees of dish offsets illustrated as Da through Dn. Simply, a well centered positioning of each dish is not required as the capturing engagement can translate both along and across each panel.

While the foregoing configuration includes the provision of a handle to conform the interlocked combination into a dish carrier, a simpler form illustrated in FIG. 7 useful to serve only as a dish stand generally designated by the numeral 110, comprising panels 111-1 and 111-2 again interlocked but having the handle omitted. Like numbered parts functioning in a like manner to that previously described, panels 111-1 and 111-2 are again defined by inner edges 11-1$i$ and 11-2$i$ which are each provided with recesses illustrated here as only recesses 15$a$ and 15$n$ where each are again composed of edge arc segments 18 opposed by the convex curvatures 17. Of course, the previously described interlocking notches and panel extensions are all repeated in this configuration as is also the convenience of use of the upper edges 111-1$u$ and 111-2$u$ to support yet another dish, each lower support also obtaining the forgiving nature of the cantilevered dish capture also previously described.

The above dish supporting benefits and fabrication convenience of a folding panel structure can be further multiplied by joining the free edges of each panel pair to the corresponding free edges of yet another panel pair in accordance with the second implementation of the present invention illustrated in FIGS. 8 through 13. By particular reference to FIGS. 8 through 10, the second inventive implementation, generally designated by the numeral 210, comprises two interconnected pairs of substantially similar, generally rectangular panels which by their substantial similarity to the panels previously described shall be designated herein as panels 211-1 and 211-2 combining to form the first panel pair and panels 221-1 and 221-2 forming the second pair with each of the panels again defined by a similarly dimensioned rectangular planform respectively defined by inner longitudinal edges 211-1$i$, 211-2$i$, 221-1$i$ and 221-2$i$ and outer longitudinal edges 211-1$o$, 211-2$o$, 221-1$o$ and 221-2$o$.

Figure 13:
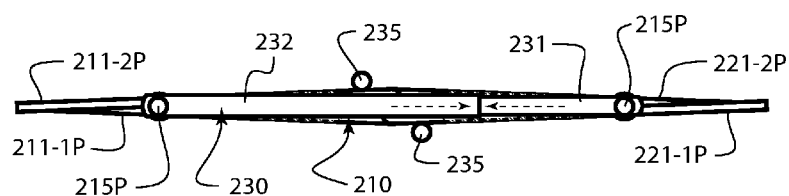
FIG. 13 is a further top view of the second implementation of the inventive dish support assembly collapsed for storage.

Unlike the first inventive implementation, however, the panels of each pair are not notched for a crossing interlock but are hinged to each other instead at the upper and lower ends of their inner edges by an upper and a lower hinge 215U and 215L. A similar set of an upper and lower hinge 225U and 225L is then useful to join the upper and lower ends of each of the outer edges 221-1$o$ and 221-2$o$ of the second panel pair which, by virtue of the generally similar planform dimensions of each of the panels results in a hinged parallelogram structure which can be collapsed on top of each other for storage, as illustrated in FIG. 13, or expanded to the three-dimensional form illustrated in FIGS. 8 and 9 and particularly in FIG. 11.

Like numbered parts functioning in a like manner to that previously described, the hinged inner edges of each of the panel pairs are again provided with a plurality of matched edge recesses 15-1 through 15-$n$ that are each lined with the resilient strip 16 to cushion and engage in cantilever the edges of received dishes D. Of course, as this second implementation entails two such panel pairs the number of dishes thus suspended is accordingly multiplied with the various dish edge engagements in each instance assured by the shaping of the various recesses as previously described.

A resilient telescoping tubular handle structure 230 comprising an inner tube segment 231 received within an outer tubular segment 232 is then engaged at the free ends thereof to hinge pins 215P of each of the upper hinges 215U to serve as a handle bridging across the hinged parallelogram formed by the panels both when collapsed for storage or when deployed to support the array of dishes D, with the flexure of the telescoped handle structure assuring a frictional engagement between the segments thereof as the loaded assembly 210 is carried. Of course, in a manner well known in the art each of the hinge pins 215P may include a threaded portion 215T to threadably engage the corresponding hinge pivot. A pair of opposing exterior pull tabs 235 adjacent the outer edges of each panel pair are then useful to expand a collapsed assembly into its three-dimensional form to be supported on the ground G (or on any other horizontal surface) to facilitate the loading and unloading of the dishes D.

While in most instances the expanded parallelogram form of this hinged assembly is sufficiently stable for the loading and unloading process each of the inner edges of each panel pair may include projections 211-1P, 211-2P, 221-1P and 221-2P extending distally in a clearing configuration below each of the lower hinges 215L to expand the supporting base dimensions which may be particularly useful in settings where large dish arrays are entailed. Of course, it will be appreciated that similar base support expansions can be also provided at each of the hinged outer edges and it will also be appreciated that the bridging deployment of the handle assembly may extend between the hinges 225U at the upper ends of the outer edges of each pair.

Referring to FIG. 14, a perspective view of a third implementation of the inventive dish support assembly 301 is seen which may be a fixed or portable structure. A base structure 303 may be a box structure or a solid structure which can be lifted and transported. Conversely, base structure 303 can be a part of another structure, including attachment to or near a stable structure such as a barbeque side shelf, grill table or the like. Immediately atop the base structure 303 is a top pivoting structure 305 which may preferably be pivotally mounted, either to the base structure 303 or to some other point of support, especially in the case where base structure 303 is a part of another structure. A handle 307 is shown attached to the top pivoting structure 305 to facilitate manipulation. In the case where inventive dish support assembly 301 is portable, a latch mechanism may be preferable to keep top pivoting structure 305 closed with respect to base structure 303 during transport. A dish D is shown resting atop the top pivoting structure 305 to illustrate a possible relative dimension and to show that a plurality of dishes D might be stackably storable with inventive dish support assembly 301.

The top pivoting structure 305 has an upper rear edge 309 which is near and within pivot range of contact of an upper rear edge 311 of the base structure 303. A hinge 315 is partially seen at a point where the rear lower part of the top pivoting structure 305 contacts the base structure 303. Hinge 315 is located such that upon opening of the top pivoting structure 305 with respect to the base structure 303 that upper rear edge 309 arcs toward upper rear edge 311 until the become closely adjacent to each other and the top pivoting structure 305 is prevented from further pivoting with respect to the base structure 303. This relationship is one of many ways to limit the pivoting displacement of the top pivoting structure 305 with respect to any base structure including base structure 303.

Referring to FIG. 15, a perspective view of the third implementation of the inventive dish support assembly 301 of FIG. 14 is shown with the top pivoting structure 305 shown in a vertical position. Hinge 315 is seen as extending across the boundary between the bottom of the top pivoting structure 305 and a solid top surface 319 of base structure 303. The top pivoting structure 305 is seen as having a pair of underside members 321 which may be present for purposes of strengthening the top pivoting structure 305. A pair of pivoting panels, including a first pivoting panel 325 is seen as overlapping a second pivoting panel 327. First pivoting panel 325 is attached to top pivoting structure 305 with a first pivoting panel hinge 331, while second pivoting panel 327 is attached to top pivoting structure 305 with a second pivoting panel hinge 333. The first and second pivoting panel hinges 331 and 333 can be placed at depths so as to use the pair of underside members 321 to limit the opening angular displacement of the first and second pivoting panels 325 and 327 if desired.

The first and second pivoting panel hinges 331 and 333 are seen with a series of closed boundary structural openings 337 both for aesthetic appearance, for reducing weight of material, and for giving a more complete view of any set of dishes D supported by the inventive dish support assembly 301 to give a more complete appearance of food presentations supported by a set of dishes D. Using the inventive dish support assembly 301 as both a presentation display and as a passive self-service server seems to be a recent trend for flexibility in scheduling and use of banquet personnel. As before, first and second pivoting panels 325 and 327 have a series of recesses each having an upper curved surface 341 opposite a lower generally straighter surface 343.

Each of the first and second pivoting panels 325 and 327 is shown as having a lower horizontal projection member 345, with each lower horizontal projection member 345 having a surface bearing member 347 for supportive contact on the solid top surface 319. Other structures other than a lower horizontal projection member 345 and a downwardly projecting surface bearing member 347 are possible. However, the use of a lower horizontal projection member 345 gives the ability for some limited flexing, while the surface bearing member 347 can help to isolate the width of member that should be provided for across the threshold of any structure leading into the inside of the top pivoting structure 305, such as when it is box-like, or where structures are included and positioned to keep the first and second pivoting panels 325 and 327 from deploying except upon positive manipulation. Note that the solid top surface 315 of base structure 303 can be used such as for logos and advertising. It is possible for base structure 303 to be box shaped, and to have a solid surface at the bottom of the box structure (not shown). In this case, the top pivoting structure 305 would have a lower line of pivot with respect to a lower level within the box shaped structure (not shown), for example.

Figure 16:
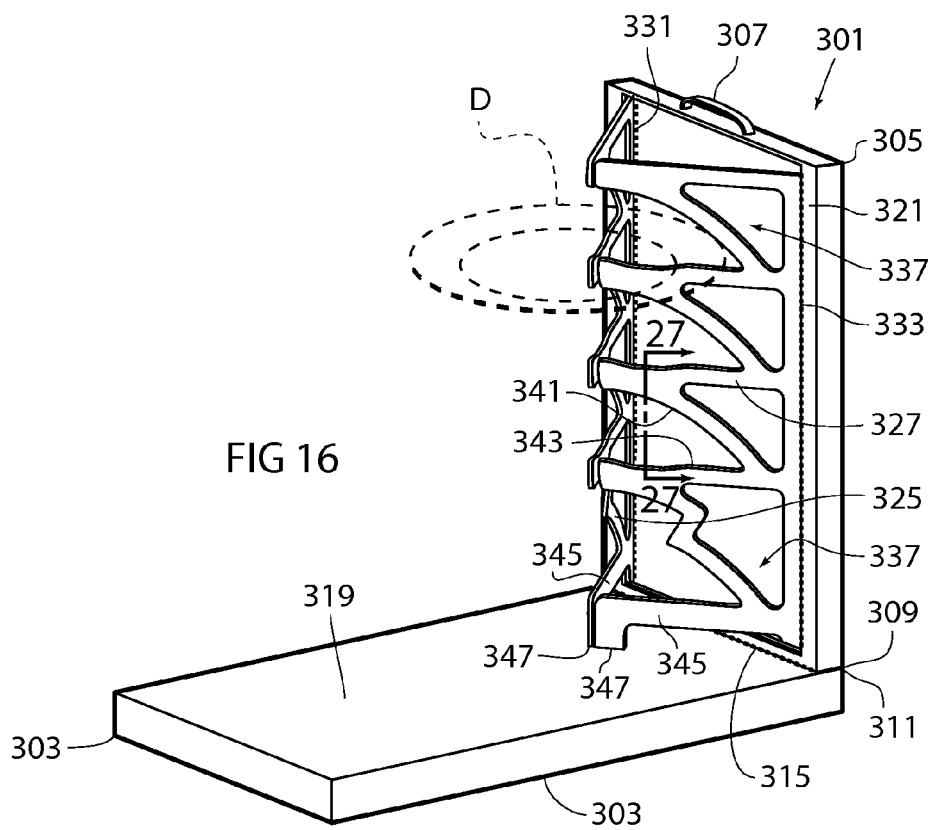
FIG. 16 is a perspective view of the first version of the third implementation of the inventive dish support assembly of FIG. 14 & shown in an open deployed position and shown wherein at least one of the panels contributes to vertical stability of the third structural member by bearing upon a surface.

Referring to FIG. 16, a perspective view of the third implementation of the inventive dish support assembly of FIG. 14 and FIG. 15 illustrates a completely open and stable deployed position for the inventive dish support assembly 301. The first and second pivoting panels 325 and 327 are each pivoted to assume an angle with respect to the top pivoting structure 305 with both the first and second pivoting panels 325 and 327 preferably assuming the same angle with respect to the linear width of the top pivoting structure 305. The first and second pivoting panels 325 and 327 are shown having a width so that the outermost projections can either touch or be so closely adjacently located that they can visually easily and manually achieve their proper orientation. Of course, the lengths of the first and second pivoting panels 325 and 327 may vary, and where they do not touch each other, but some mechanism would or should be added to insure that they pivot to the correct angular orientation. The stability created when first and second pivoting panels 325 and 327 are brought together can be enhanced with magnet inserts or attachable and detachable devices. It should also be noted that the overall size of the inventive dish support assembly 301 and dish D should insure that adequate clearance will exist between the dish D and the underside of the top pivoting structure 305 inside the first and second pivoting panels 325 and 327.

Figure 17:
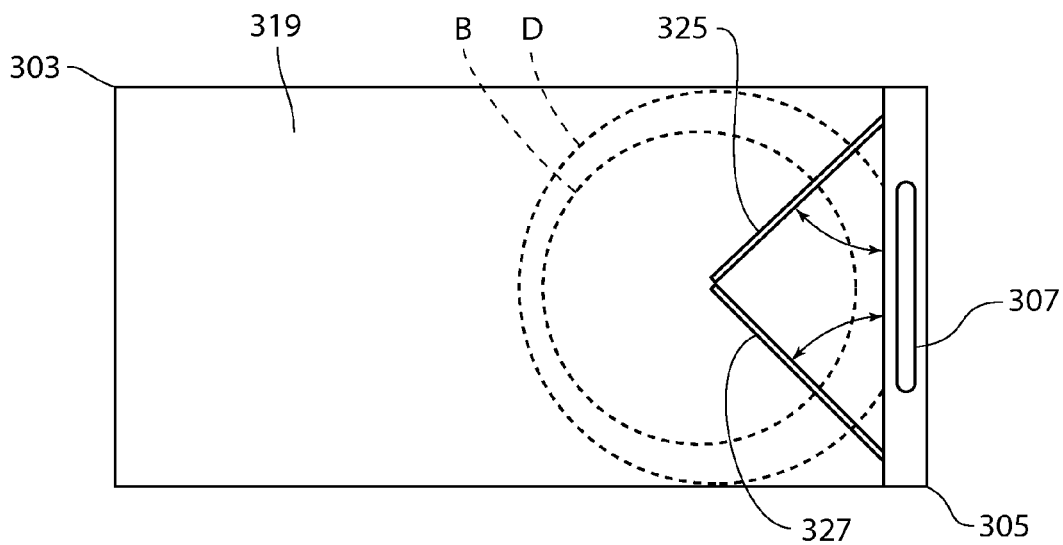
FIG. 17 is a top view looking down upon the first version of the third implementation of the inventive dish support assembly of FIG. 16 and illustrates the angular position of the first and second pivoting panels.

Referring to FIG. 17, a top view looking down upon the third implementation of the inventive dish support assembly of FIG. 16 illustrates the angular position of the first and second pivoting panels 325 and 327. The amount of area of solid top surface 319 is also seen as more than ample, and particularly area of solid top surface 319 from the middle of the base structure 303 and extending away from the top pivoting structure 305 that will not be blocked or shadowed by any dishes D being supported by first and second pivoting panels 325 and 327. Ample space will be had for logo advertising, or attachment of a description relating to the food which might be pre supported by any dishes D that are supported by first and second pivoting panels 325 and 327. Such information may relate to the types of foods present, how the food was prepared, and any warnings and concerns regarding allergic component content, for example.

Referring to FIG. 18, a perspective view of a second version of a third implementation is seen as an the inventive dish support assembly 351 where a third structural member 355 is supported to vertically lift from a rearwardly mounted bracket which is shown in a most simple realization as a first bracket rail 357 spaced apart from a second bracket rail 359. Logical extension of the area of the first and second bracket rails 357 and 359 may lead to a single piece rectangular box shape with an open upper end. The first and second bracket rails 357 and 359 are illustrated in the figures both to emphasize the possibility for a minimalist bracket and to facilitate illustration of the other components of the inventive dish support assembly 351 in the figures. Also emphasized is that first and second bracket rails 357 and 359 need be only long enough to give stable support, and can garner that stability based upon what structures are available for affixation.

The first and second bracket rails 357 and 359 may be attached to or near a stable structure such as a BBQ side shelf, grill table, or the like, and which is shown as a base structure 361. Inventive dish support assembly 351 is shown in FIG. 18 in the deployed position in combination with support from the base structure 361. The first and second bracket rails 357 and 359 are shown in close attached relationship with the base structure 361 but in actual used the first and second bracket rails 357 and 359 can be attached to any structure. One possibility would be for first and second bracket rails 357 and 359, instead of being attached forward to the base structure 361, may be attached to a wall, especially where base structure 361 is mobile and can be positioned in front of the first and second bracket rails 357 and 359. In this configuration, it may be more helpful to replace first and second bracket rails 357 and 359 with a box so that the stowage of the inventive dish support assembly 351 would prevent it from being seen when not in use. This configuration would be especially advantageous for a multi-use room of a restaurant, for example where walls may provide greater stability than a moveable small table.

In FIG. 18, third structural member 355 pivotably supports a first pivoting panel 365 and a second pivoting panel 367. However, second pivoting panel 367 is shown to have a handle portion 371 which may normally extend above third structural member 355 and include a handle slot 373 having a handle member 375 to broaden the area of manual engagement. Third structural member 355 has a top member 377 and a pair of underside members 379. The geometry with which the handle portion 371 of the second pivoting panel 367 and its handle slot 373 is accommodated by the structural member 355 top member 377 as it extends upwardly and beyond the confines of the storage area within the third structural member 355 may vary. The top member 377 may simply have an abbreviated depth which accommodates the thickness of the handle portion 371, or the upper part of the second pivoting panel 367 may have a slight "S" bend that enables the lower part of second pivoting panel 367 to fit within the confines of the third structural member 355 up to or near the level of the top member 377.

First and second pivoting panels 365 and 367 have features in common with first and second pivoting panels 325 and 327 seen in FIGS. 14-17. A first pivoting panel hinge 381 (obscured due to the angle of view of FIG. 18) and a second pivoting panel hinge 383 enable the first and second pivoting panels 365 and 367 to the deployed position see in FIG. 18, and to a stowed position. First and second pivoting panels 365 and 367 also have a number of closed boundary structural openings 387, and a series of recesses each having an upper curved surface 391 opposite a lower generally straighter surface 393. The lower generally straighter surface 393, like surface 343 need not be completely linear, both for aesthetics and to support any lower protrusion on dish D. First and second pivoting panels 365 and 367 each also have a lower horizontal projection member 395 and a surface bearing member 397.

However, unlike the case of the inventive dish support assembly 301 which had its own attached base structure 303, the inventive dish support assembly 351 may not have some other structure of adequate area and support upon which the structure upon which the surface bearing member 397 of the lower horizontal projection member 395 can depend, and some secure mechanism should be available to indicate that the inventive dish support assembly 351 is in a stable deployed position. A pivoting support 401 has a hinge 405 that connects it to a lower end of the third structural member 355. The pivoting support 401 can be provided in a number of shapes, but the shape here is generally that of an annular triangle having a closed boundary structural openings 407 and a pair of projections 409 which can help indicate the extent of a top surface likely to underlie dishes D. When the pivoting support 401 moves from a vertical position to a horizontal position, especially touching a solid top surface 411 of base structure 361, and especially downwardly reinforced by the first and second bracket rails 357 and 359, it may act to lock the third structural member 355 against downward movement with respect to the first and second bracket rails 357 and 359. Such locking action can occur with respect to a base structure 361, or with respect to first and second bracket rails 357 and 359 if the pivoting support 401 is wide enough, or if the first and second bracket rails 357 and 359 are close enough together or blended or connected at the top to form a structure over which the pivoting support 401 may extend. At the top of the third structural member 355 the extent to which handle portion 371 extends above third structural member 355 is noticed.

Referring to FIG. 19, a perspective view of the second version of the third implementation of the inventive dish support assembly 351 of FIG. 18 is shown with the first and second pivoting panels 365 and 367 of third structural member 355 in a largely stowed position, but with the third structural member 355 still above the first and second bracket rails 357 and 359. The position shown in FIG. 19 is that such that the first steps toward stowing have been accomplished. The next step is to lift the pivoting support 401 to enable the third structural member 355 to be moved downwardly as guided by the first and second bracket rails 357 and 359 to complete stowing the inventive dish support assembly 351.

Figure 20:
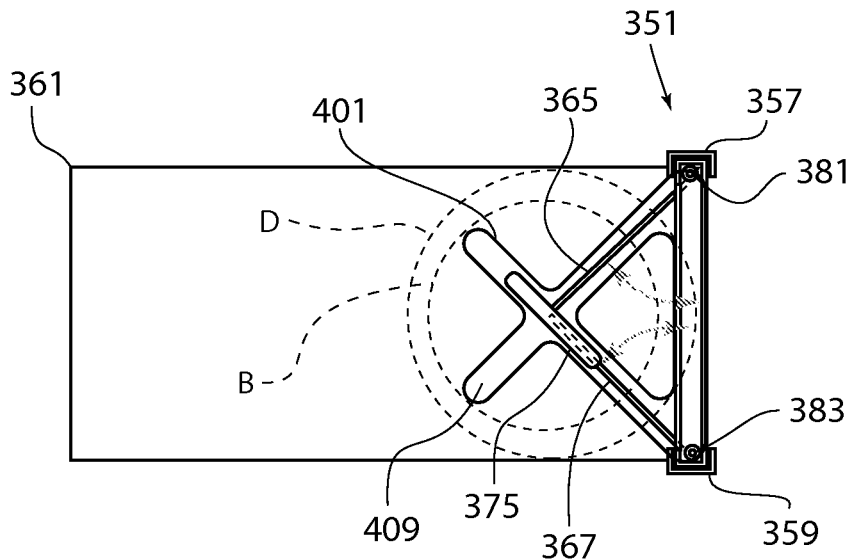
FIG. 20 is a top view of the second version of the inventive dish support assembly in a position most closely as it was seen in FIG. 18.

Referring to FIG. 20, a top view of the second version of the inventive dish support assembly 351 in a position as it was seen in FIG. 18. The annular triangular shape of the pivoting support 401 and the pair of projections 409 assist in getting a visual cue while manually setting the position of the first and second pivoting panel 365 and 367. In FIG. 20, it is most noticeable that the most distal end of the handle portion 371 extends beyond the apex of the meeting of the first and second pivoting panel 365 and 367, especially when handle portion 371 is designed to generally center with respect to the third structural member 355. Also more clearly seen are the first and second pivoting panel hinges 381 and 383. The first and second pivoting panel 365 and 367 are seen as having a right angled, ninety degree orientation, but a perpendicular relative angle between the first and second pivoting panel 365 and 367 is not required. The angular relationship can be narrower or wider in either direction. A dish D, can be supported with wider or narrower angled first and second pivoting panels 365 and 367.

Figure 21:
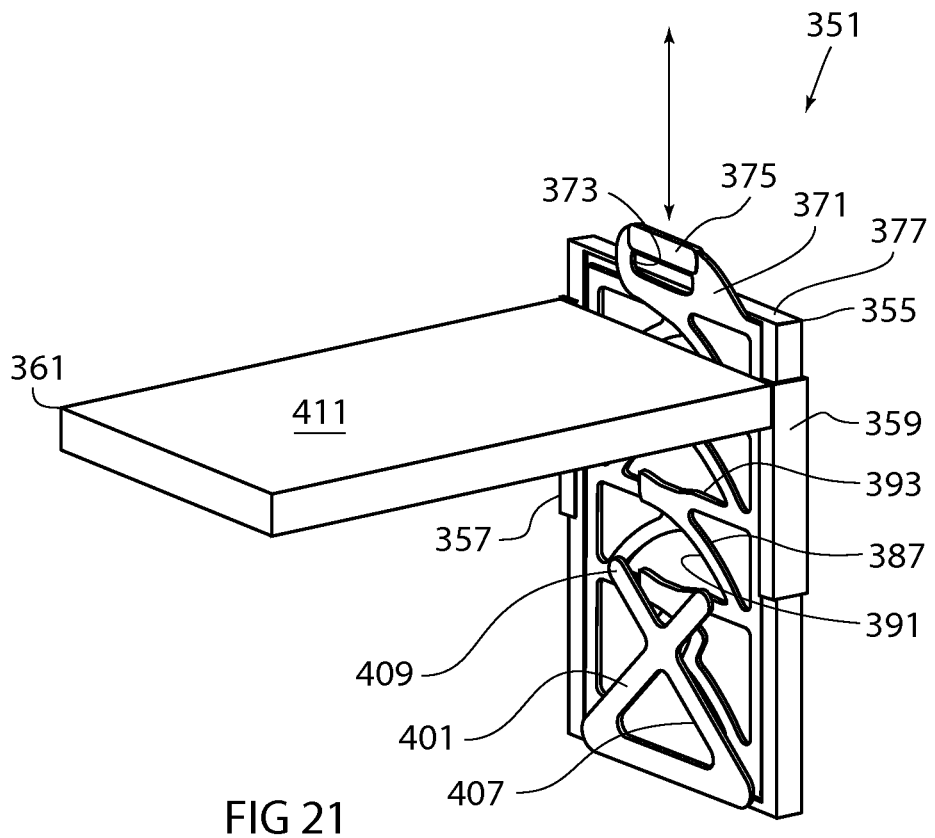
FIG. 21 is a perspective view of the second version of the third implementation of the inventive dish support assembly of FIGS. 18-20 and seen in a nearly fully stowed position lowered with respect to the first and second bracket rails.

Referring to FIG. 21, a perspective view of the second version of the third implementation of the inventive dish support assembly 351 FIGS. 18-20. In FIG. 21 a nearly fully stowed position is achieved with the third structural member 355 shown at a lowered position with respect to the first and second bracket rails 357 and 359. The position shown is also a view such that the third structural member 355 may have been just lifted to begin to deploy the inventive dish support assembly 351. FIG. 21 also emphasizes the possibility that the stop position for the third structural member 355 can be supplied to limit the downward movement of the third structural member 355 using any number of structures, including: limit pins on the third structural member 355 and matching slots on the first and second bracket rails 357 and 359; a stop pin mounted on the rear of the handle portion 371, a bracket underneath the third structural member 355 where the first and second bracket rails 357 and 359 are wall mounted; and many more possibilities. Also seen in FIG. 21 is the vertical position of the pivoting support 401 which is achieved during late stowage and early deployment.

Figure 22:
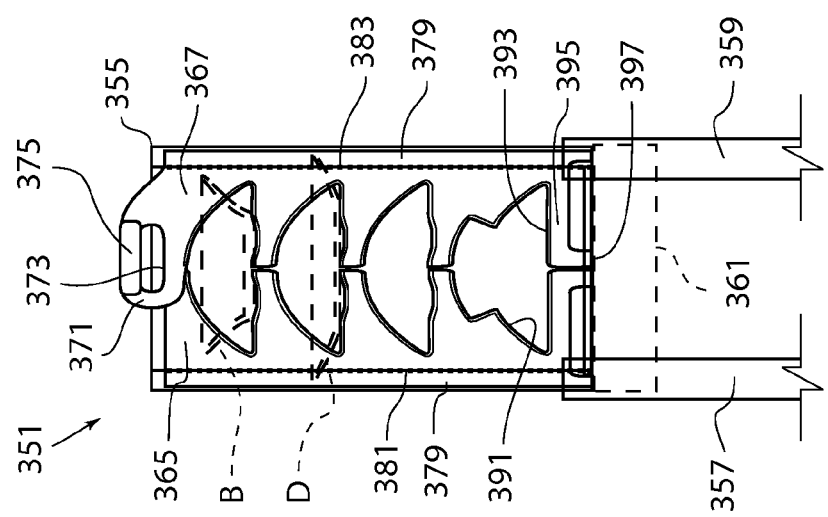
FIG. 22 is a plan view looking into the inventive dish support assembly of FIGS. 18-21, but particularly similar to the view of FIG. 18, and illustrating the shapes formed by the bilateral bringing together of first and second pivoting panels.

Referring to FIG. 22, a plan view looking into the inventive dish support assembly 351 of FIGS. 18-21, but particularly similar to the view of FIG. 18, illustrates the shapes formed by the bilateral bringing together of the first and second pivoting panel 365 and 367 and formed by the opposite pairs of upper curved surfaces 391 and lower generally straighter surfaces 393. Spaces for fitting a bowl B and dish D are shown in broken line format.

Figure 23:
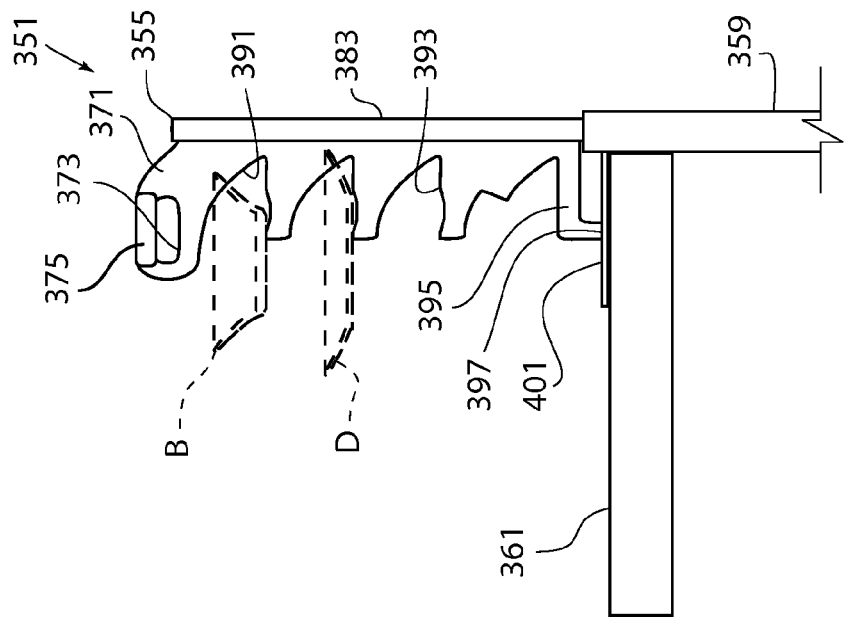
FIG. 23 is a right side view taken perspective view of the second version of the third implementation of the inventive dish support assembly 351 of FIGS. 18-22 & corresponding more nearly to the position seen in FIG. 18, and illustrates the side perspective useful in describing the effective shapes of the dish support structure shown later in a schematic illustration.

Referring to FIG. 23, a right side view of the second version of the third implementation of the inventive dish support assembly 351 of FIGS. 18-22 is shown, but corresponding more nearly to the position seen in FIG. 18, is shown. In FIG. 23 a bowl B and dish D is shown as supported by the inventive dish support assembly 351. The view of FIG. 23 is also important as it sets a look-through perspective which can encourage discussion and consideration of first and second pivoting panel 365 and 367 which approach each other at different angles, but the effective equivalent side view will generally not change over the angular range of approach of the of first and second pivoting panel 365 and 367 which may preferably be from thirty degrees to one hundred fifty degrees, and more preferably from sixty degrees to one hundred twenty degrees and may most preferably be ninety degrees. Using the law of sines and cosines, the dimensions, angles, arc radii of the view of FIG. 23 can be operated upon to yield the dimensions, angles, arc radii of a flat panel such as panels 365 or 367.

Referring to FIG. 24 a front plan view taken of the second version of the third implementation of the inventive dish support assembly 351 of FIGS. 18-23 is shown, but corresponding more nearly to the position seen in FIG. 19, is shown. In FIG. 24 the pivoting support 401 is in raised position and the third structural member 355 is shown slightly higher with respect to the first and second bracket rails 357 and 359. The view of FIG. 24 also illustrates the handle portion 371 may be slightly to one side when the first and second pivoting panel 365 and 367 are shown in the stowed position.

Referring to FIG. 25 a right side view of the second version of the third implementation of the inventive dish support assembly 351 of FIGS. 18-24 is shown, but corresponding more nearly to the position seen in FIG. 21, is shown. In FIG. 25 the compactness of the components (shown in broken line format) within the third structural member 355 are seen. In FIG. 25 the ordering of the pivoting support 401, second pivoting panel 367 and first pivoting panel 365 are seen.

Figure 10:
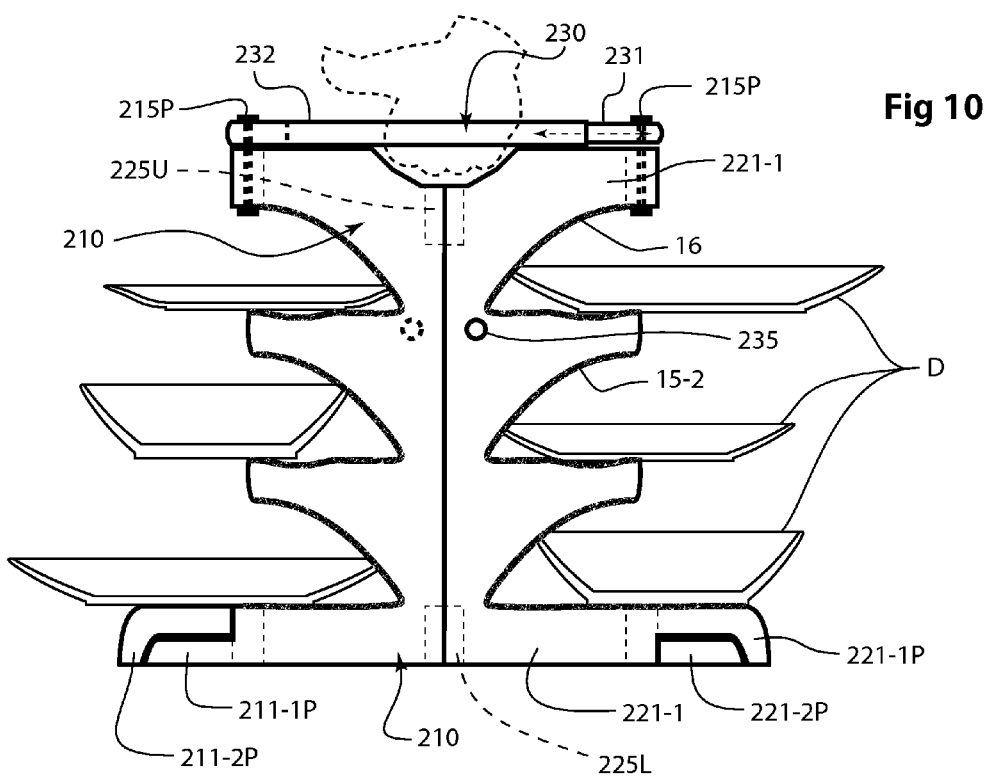
FIG. 10 is a side view of the deployed form of the second implementation of the inventive dish carrying assembly shown in FIG. 8 and illustrating the configuration thereof in the course of use.
Figure 12:
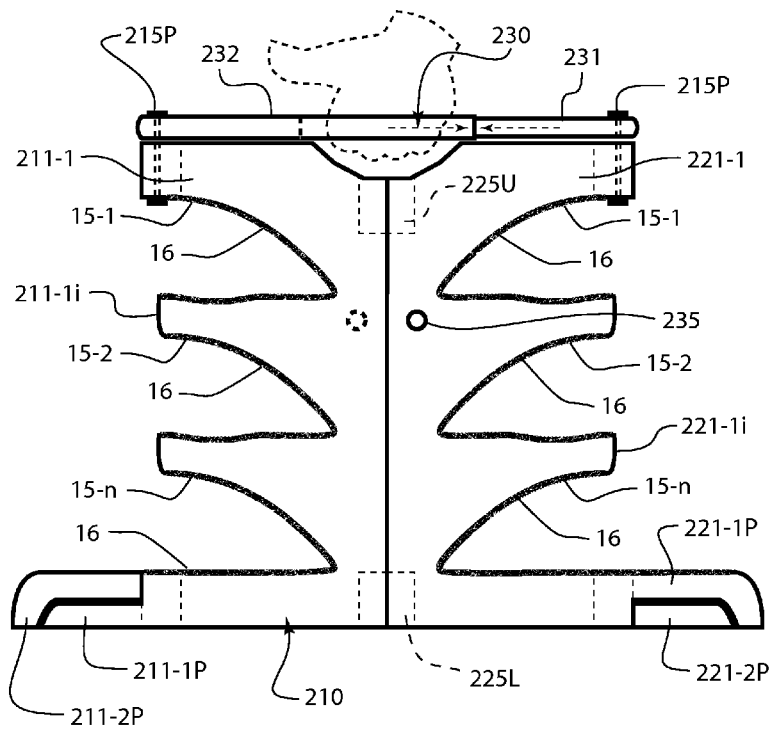
FIG. 12 is a further side view illustrating the second implementation of the inventive dish carrying assembly in its collapsed form for storage.
Figure 26:
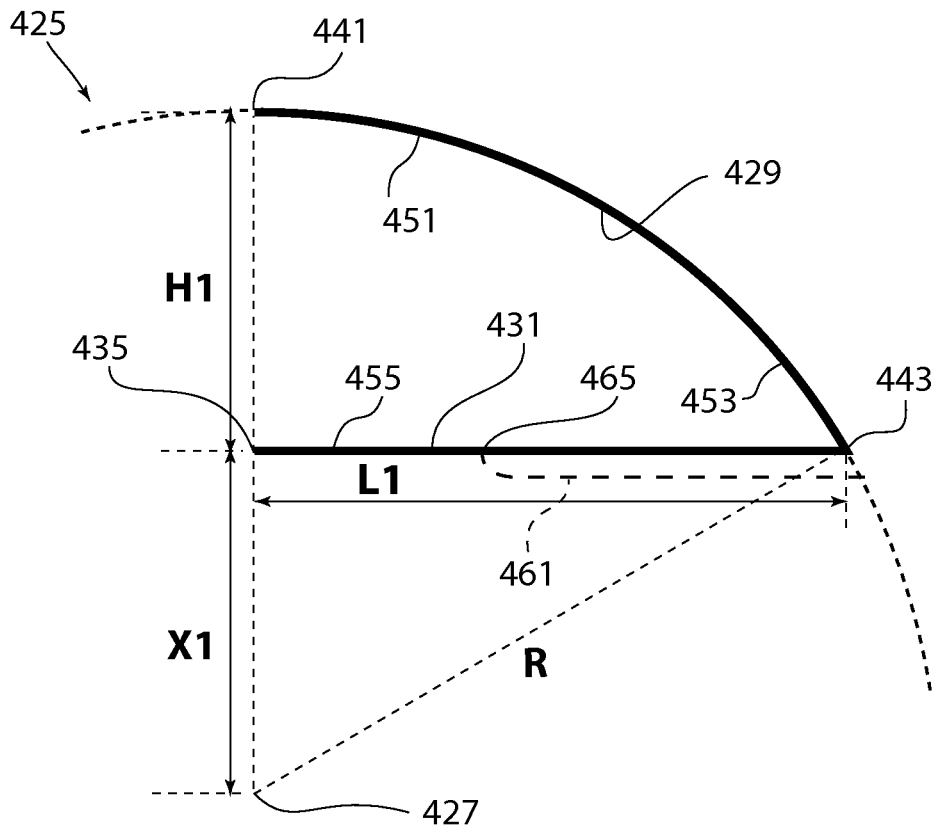
FIG. 26 is an expanded schematic right side view of the inventive dish support assembly most similar to the view taken across two panels seen in FIG. 23, and is used to illustrate a series of equations which help to define the inventive dish support assembly.

Referring to FIG. 26 a schematic right side view of the inventive dish support assembly 10, 110, 210, 301 and 351, similar to that seen in FIG. 10, & FIG. 23 is used to illustrate a view across the pair of angled members that project the angled pairs of upper curved surface 15, 16, 341, & 391 opposite the angled pairs of lower generally straighter surface 17, 343, & 393. The schematic system seen in FIG. 26 will be used to illustrate the essence of a Waksul system 425. seen in FIGS. 1-24. An arc segment of a circle having radius R with respect to an origin 427 is shown as arc segment 429. The arc segment 429 is a representation of a plan view projection of a side view of the angled pairs of upper curved surface 15, 16, 341, & 391, regardless of the angle taken by pairs of any of the panels 11, 111, 211, 221, 325 and 327, 365, or 367 that provide angled pairs of upper curved surface 15, 16, 341, & 391. Likewise, a chord line 431 is a representation of a plan view projection of a side view of the angled pairs of lower generally straighter surface 17, 343, & 393 regardless of the angle taken by pairs of any of the panels 11, 111, 211, 221, 325, 327, 365, or 367 that provide angled pairs of lower generally straighter surface 17, 343, & 393.

The arc segment 429 opposite a chord line 431 are used to describe the basic opposing shapes of the Waksul system 425. The general limits will be given followed by practical relaxation of aspects of the geometry of the arc segment 429 and chord line 431. The basic shape of the projection of the opening for supporting dish D and bowl B is described by arc segment 429 and chord line 431. A vertical line from the uppermost height of the circle from which arc segment 429 is taken and extending back to the origin 427 includes a dimension H1 from the uppermost height of the arc segment 429 to the chord line 431, and a dimension X1 from the chord line 431 and back to the origin 427. The meeting point of H1 and X1 is vertically at a point 435, and which may also be referred to as a theoretical fulcrum point.

The length of the chord line 431 is designated as L1. Regardless of the arc segment radius R, a Waksul ratio of L1 divided by H1 can be designated W. It has been discovered that the system of FIG. 26 may reduce itself to a series of three equations to be used to select a range of optimum values for H1, L1 and R, and are as follows:

$$W = (L1)/(H1) \quad (1)$$

$$R = (X1) + (H1) \quad (2)$$

$$R = H1(1+W^2)/2 \quad (3)$$

The length of the chord line L1 can readily be found by noting in FIG. 26 that the points including origin 427, point 443 and point 435 forms a right triangle with lengths X1, L1 and R such that the pythagorean theorem can be applied to supply the equation $(X1^2 + L1^2 = R^2)$. As such once R is set and once H1 is specified, L1 is readily obtainable and the equations describing the inventive system will be completely known.

Equation (1) is an equation for a factor W which equals the ratio to the length of the L1 of the chord line 431 to the distance H1. Equation (2) is simply a realization that for the vertical distance along the radius line R, that a bisection of the line R at any point produces an upper distance H1 and a lower distance X1 that sum to the total length of the radius R. Equation (3) is the equation that operates to give pairs of values (and ranges of values) of H1 and R which are acceptable for the inventive dish assemblies 10, 110, 210, 301 and 351. For these ranges of values of H1 and R, corresponding values of L1 are determined through the selected Waksul factor W.

Inventive dish assemblies 10, 110, 210, 301 and 351 will preferably have Waksul factors W between the values of 1.30 and 5.0, and even more preferably between the values of 1.50 and 1.90 with the ideal value most preferably being about 1.75. These considerations are understood with the knowledge that actual Inventive dish assemblies 10, 110, 210, 301, & 351 are expected to have shape difference that significantly differ from the diagram of FIG. 26. Further, it is understood that the system of FIG. 26 need only be replicated to reproduce portions of shapes upper curved surface 15, 16, 341, & 391 where supportive engagement with a dish D or bowl B is likely to occur. It is also understood that the system of FIG. 26 need only be replicated to reproduce portions of the generally straighter surface 17, 343, & 393 where supportive engagement with a dish D or bowl B is likely to occur.

The vertically uppermost point of the circle from which the arc segment 429 is taken, may be labeled point 441. The intersection of the circle from which arc segment 429 is taken may be labeled point 443. It is clear that a bowl B or dish D having a height H1 will not be effectively supported by contact with the arc segment 429 immediately adjacent point 441. As the portion of the arc segment 429 being engaged is more vertical, any bowl B or dish D will have a lesser ability to support a downward force moment.

Remembering that the diagram of FIG. 26 is not to scale and that a range of values for R and for H1 are possible, and for visual understanding and reference, a number of points will be identified that will assist in a discussion of variances in the shape of the arc segment 429 and chord line 431. A description of variations at the area where arc segment 429 and chord line 431 meet, as well as the extremes distal to the area where arc segment 429 and chord line 431 meet will assist in identifying permissible design changes for visual aesthetics and other reasons, and yet not deviate from the basic Waksul inventive design, of which inventive dish assembly 10, 110, 210, 301 and 351 are only a few of thousands of examples.

Discussion of variances referred to above be facilitated by an indication of additional points (not to scale) generally for three areas of the schematic of FIG. 26. A point 451 spaced apart from point 441 along arc segment 429 is shown, and a point 453 spaced apart from point 443 along arc segment 429 is also shown. A point 455 is shown spaced apart from point 435 along chord line 431. A reduced height portion of chord line 431 is seen as a lower level line 461 which transitions to a parallel path with chord line 461 and which begins at point 465.

A first area where deviation may be expected is between points 441 and 451. In general, depending upon the values chosen for R and H1, it may be unlikely that a bowl B or dish D could be selected that would engage and gather effective support by engagement along arc segment 429 between points 441 and 451. It is thus expected that a designer might eliminate the arc segment 429 between points 441 and 451 completely, or change the shape of arc segment 429 between points 441 and 451 to an upward or downward flair, for example. The result is that an inventive dish support assembly 10, 110, 210, 301 and 351 could be provided where the arc segment 429 between points 441 and 451 was eliminated or changed radically such as by replacing it with a fanciful or attractive shape for aesthetic purposes, and yet still fit within the inventive Waksul formula.

A second area where deviation may be expected is between points 443 and 453. A designer might have a pre-existing range of sizes for bowl B or dish D, and choose values for H1 and L1 that give that designer the best results for a inventive dish assembly 10, 110, 210, 301 and 351, or other similar structure. It is thus expected that a designer might eliminate a portion of the arc segment 429 between points 443 and 453 by either providing a direct or angled line from point 453 and downward to the chord line 431, or in the alternative by changing the shape of the arc segment 429 into a different shape and extending boundary between point 453 and where it meets chord line 431 at a point farther to the right of point 443 and extending the length L1 of the chord line 431. A designer might do this for a fanciful pattern and effect. Extending or contracting chord line 431 on its right hand side, near the area where arc line 429 meets chord line 431 (especially to disrupt the arc shape, increase the depth, or truncate the depth of the area between chord line 431 and arc segment 429 near point 443) has minimal effect upon performance of inventive dish assembly 10, 110, 210, 301 and 351, or other similar structure constructed according to the Waksul formula.

A third area where deviation might be expected is between points 435 and 455. However, shortening chord line 431 from the intersection of the chord line 431 and a vertical radius R extending downward from point 441 at point 435, as by removal of material between points 435 and 455, could compromise performance. The forces developed to support a dish D, in the schematic diagram of FIG. 26 as drawn, is an upper force moment between point 435 as a fulcrum point which supports a lower portion of dish D in an upward direction, combined with a downward force moment on an upper edge of a dish D at a point of engagement of an upper edge of dish D at a point of engagement of the arc segment 429. So long as an engagement of dish D on the arc segment 429 coupled with a sufficient fulcrum located at point 435 the dish D will be best supported. Thus, if material is removed between points 435 and 455, performance may suffer, and may cause loss of reliable support of a number of different sizes and types of dishes D and bowls B that can be supported.

A fourth area where deviation might be expected is between points 465 and 443 and is shown as a further accommodating deviation from a strictly linear chord line 431 is seen as an lower level line 461 which transitions to a parallel path with chord line 461 at point 465 and extending to a point near or to point 443. It may be common for dish D to have a downwardly disposed bottom rim raised from its central planar extent and just a few inches inside its outermost concentric extent. For a completely flat chord line 431, a downwardly disposed bottom rim on a dish D could act as a secondary pivot, operable to cause dish D to have a false fulcrumatic position. A downwardly disposed bottom rim on a dish D might make a false fulcrum point but located much closer to point 443. Since a stable fulcrum engagement farthest away from point 443, provides the stability needed, any accommodation for the disruptive rim can improve performance. Providing for an alternative, lowered level line 461 beyond a point 465 is only one example of a change that would be more stabilizing. Other variations might include abbreviating 461 and re-continuing with chord line 431 on the way to point 443, as well as a angular transition rather than the smooth transition seen in FIG. 26. In any event, it is preferable that there be sufficient chord line 431 between point 455 and point 465 to form a stable support for dish D or bowl B, as well as enough chord line 431 in the direction of point 435 to form a stable fulcrum support for dish D or bowl B. Since the Waksul system 425 relates to a device which supports against the force of gravity, an evaluation of any structure with respect to the Waksul formula can be based upon finding origin 427 vertically or by reference to the radius of an arc segment 429. Further, arc segment 429 may be a blended arc such that a test for the Waksul formula may be applied to individual arc segments 429 within the blend.

Figure 27:
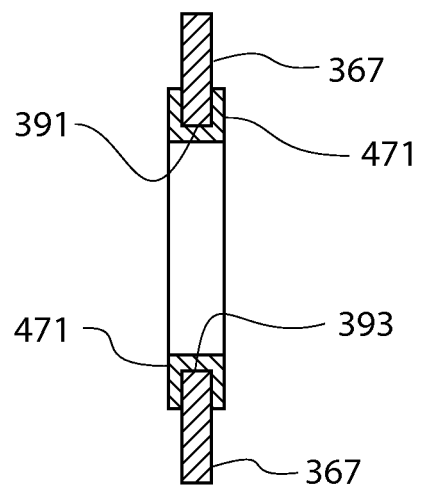
FIG. 27 is a sectional view taken along line 27-27 of FIG. 16 and illustrates the use of an optional polymeric overlay for cases where the panels of the invention are not necessarily made of non-slip, high friction material or are coated or dipped with non-slip polymeric material.

A discussion of the above deviations emphasizes that the visual appearance of a given inventive dish support assembly 10, 110, 210, 301 and 351, can be permitted and yet it still be shown to fit within the Waksul system 425 by using the equations (1), (2), & (3) and identifying an effective arc segment 429 and identifying an effective chord line 431 in a given inventive dish support assembly. As has been discussed, the materials from which inventive dish support assemblies 10, 110, 210, 301 and 351 are constructed can be elastomeric, no-slip materials. In addition an elastomeric no-slip added member can cover all or a part of the arc segment 429, chord line 431 and other parts of the inventive dish support assemblies 10, 110, 210, 301 and 351. Referring to FIG. 27 a sectional view taken along line 27-27 is used to illustrate one possible configuration of a non-slip elastomeric insert 471. Insert 471 can be a continuous length of material or cut into strips. Insert 471 is seen as providing an expanded width face to either the upper curved surface 391 opposite the lower generally straighter surface 393 in a number of circumstances. One circumstance may include the provision of a fresh surface to surfaces 391 and 393 which have been worn especially where the panels 325, 327 365 or 367 have been dipped with a non-slip material overlay, for example.

Figure 28:
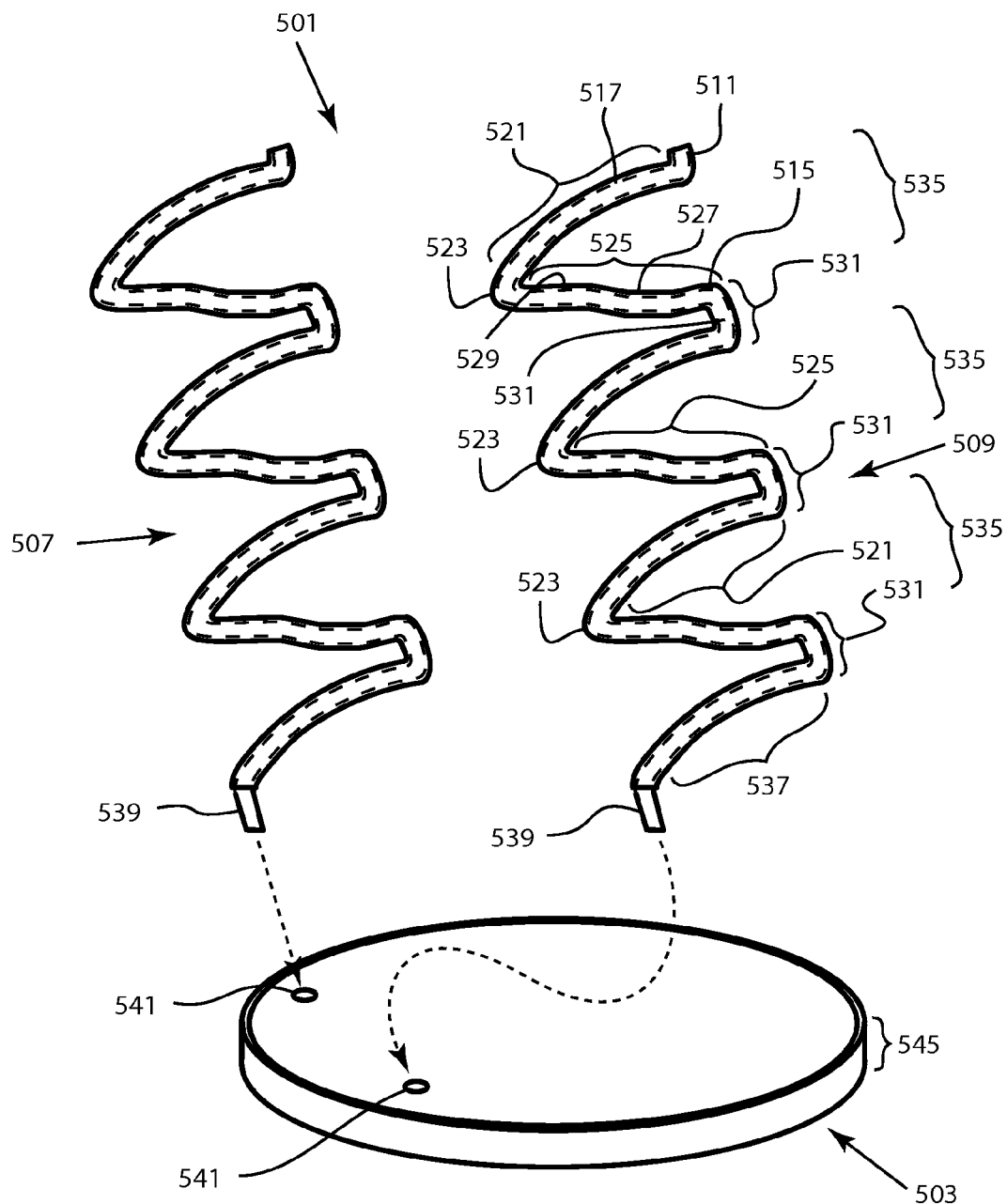
FIG. 28 is an exploded perspective view of a fourth implementation of the inventive dish support assembly that includes a base and a pair of elongate cylindrical shaped supports that may be attached to a base, to form a stylish, sturdy and simple plate support.

Referring to FIG. 28, an exploded perspective view of a fourth implementation of the inventive dish support assembly seen as dish support assembly 501 and which is of simple construction. Dish support assembly 501 is shown as having a base 503 and a pair of elongate cylindrical shaped supports 507 and 509 that may be referred to in the industry as large diameter wire supports. Supports 507 and 509 may include a solid metal cylindrical core surrounded by a dipped or spray applied elastomeric coating to assist in frictional engagement of plates or dishes D or bowls B (as will be later shown) to be supported as seen in previous figures. In general, beginning with the upper end of support 509, it may terminate in a short upwardly turned portion 511. Along the length of the supports 507 and 509, the lead line 515 may refer to the surface and/or outer elastomeric material, while lead line 517, shown in contact with the dashed extent of the internal wire, indicates the possibly underlying material 517 which gives the supports 507 and 509 their structural support. Underlying material 517 may be preferably made of steel, stainless steel, aluminum, titanium or other structurally stable materials that can be used for support. The underlying material 517 need not be solid and need not have a constant cylindrical cross section.

In terms of structural shape, the supports 507 and 509 may be seen to provide a generally repeating pattern of shapes constituting plate support structures, of which supports 507 and 509 are depicted in FIG. 28 as having three. It is understood that for a given embodiment that a cooperating pair of supports 507 and 509 may have one, two, three, four or more plate support structures. The basic plate support structure typically includes an upper curved portion surface 521 which is seen to angle at a sharp angled turn 523 into a generally straighter portion 525 which may or may not include a lower level portion 527 as part of a generalized chord line portion 529, such as to accommodate any downward rim projections on a given plate or dish D. At the end of the generally straighter portion 525, a downward turn to an abbreviated vertical portion 531 is seen and is such that the length of the abbreviated vertical portion 531 sets the spacing between adjacent basic plate support structures. At the lower end of the abbreviated vertical portion 531, a plate holding unit structure 535 which includes upper curved portion surface 521, generally straighter portion 525 and optional downward turn to an abbreviated vertical portion 531 is seen to repeat, thus repeating the structures of the basic plate support structures.

In each of the supports 507 and 509 a series of three plate holding unit structures 535 are seen. Below the lowest generally straighter portion 525, and perhaps from a point just below the uppermost abbreviated vertical portion 531, any structure may be provided to anchor the supports 507 and 509 to the base 503. A curved section 537 ends an optional angled insertion section 539.

Optional angled insertion section 539 which is shown as potentially stripped of the surface and/or outer elastomeric material 515, but this need not always be the case. In some cases the underlying material 517 can be formed of a high friction material which might, in some cases, remove the need for surface and/or outer elastomeric material 515. The same may apply to materials that can be formed with a heterogeneous gradient that will be structurally strong at the core and yet have a high friction preferably partially compressible outer surface. The use of a underlying material 517 that may be dipped or sprayed with a surface and/or outer elastomeric material 515 is illustrated as it is a combination that is more directly controllable and more easily differentiated in terms of the materials 515 and 517.

Underlying material 517 as a separate material can be metal or composite and should have an ability to have an exterior that can be permanently bonded to a surface and/or outer elastomeric material 515 having such a high friction coefficient. Where the surface and/or outer elastomeric material 515 is particularly soft, the optional angled insertion section 539 can have such soft material removed for exacting fit into the bores 541. In other cases, where the material 515 has a thin layer, the bores 541 may be of a shape and depth to provide support for plates and dishes D even with the presence of the surface and/or outer elastomeric material 515.

However, removal of the material to expose the angled insertion sections 539 can, depending upon the materials of the base structure 503 and underlying material 517, assist in forming a tighter, more stable connection. Much greater control can be had, such as a friction fit taper, or a controlled tolerance fit. In particular where a positive, close tolerance fit is desired, and where the angle of support can be chosen, the capacity of the number and size of plates and dishes D that an inventive dish assembly 501 can accommodate can also be specified. The inventive dish assembly 501 can be designed to support a number of different sized platters, plates, bowls, fry pans, cookie sheets, baking sheets, pie pans and pie plates to name a few. Dish assembly 501 can also be advantageously used for hot dishes D especially to give some control over cooling with less required space. Inventive dish assembly 501 is for supporting such structures if they are not too big or otherwise proper.

Base 503 is shown as having a circular structure, although any overall "footprint" shape can be utilized, including square, oval, star-shaped, flower-shaped, thematic designs and unusual patterns. Further, base 503 is seen as having a pair of bores 541 which may or may not be blind bores. Base 503 is shown as having a thickness dimension 545 which may enable a significant depth of the bores 541 and thus the extent to which the angled insertion sections 539 may be introduced into the bores 541 to better stabilize, support and anchor the supports 507 and 509 to the base 503.

The angled insertion sections 539 should preferably closely fit the bores 541 to provide a stable support platform for dishes D (previously shown). The three structural components, including base 503 and supports 507 and 509 can be used in a number of ways to form the inventive dish support assembly 501. First, because there are only 3 parts, and two may be identical, an operational use which provided for setup and breakdown of the inventive dish support assembly 501 at each use location would also provide minimal storage and carriage space possibilities. As will become apparent, the supports 507 and 509 can be made to lie flat upon disassembly to lie atop or within a pair of parallel planes, which is to mean that the bending occurs at a right angle to a plane of reference. Thus, although the supports 507 and 509 can have a more complex shape for aesthetics purposes, it may have a lesser cost and greater utility by being flat to a plane of reference. Therefore they may be stacked in a flat box.

Further, because the supports 507 and 509 may be identical, they may also have some stacking affinity orthogonal to their main planar extent, such as fitting on a stacking rack. With these capabilities, large numbers of the dish assemblies 501 can be efficiently stored for quick deployment. Assembly is accomplished by placing the base 503 on a surface and then inserting the angled insertion sections 539 of each of the two supports 507 and 509 into the bores 541 of the base 503. The shape of the insertion sections 539 may be complementary to the inside of the bores 541 of the base 503 in order to set the angular relationship of the two supports 507 and 509 with respect to each other upon setup. In the alternative, some other structure may be used to set their angular relationship upon setup.

A second mode of operation may be to permanently fix the two supports 507 and 509 with respect to the base 503 so that the inventive dish support assembly 501 will, in essence, exist permanently as a one piece structure. Insertion sections 539 can be fixed with respect to base 503 by any method, and in fact, the base 503 can be formed integral with the supports 507 and 509 structure, such as by molding the base preferably with extended structure continuations of insertion sections 539 being present for base 503 to be molded around.

Figure 29:
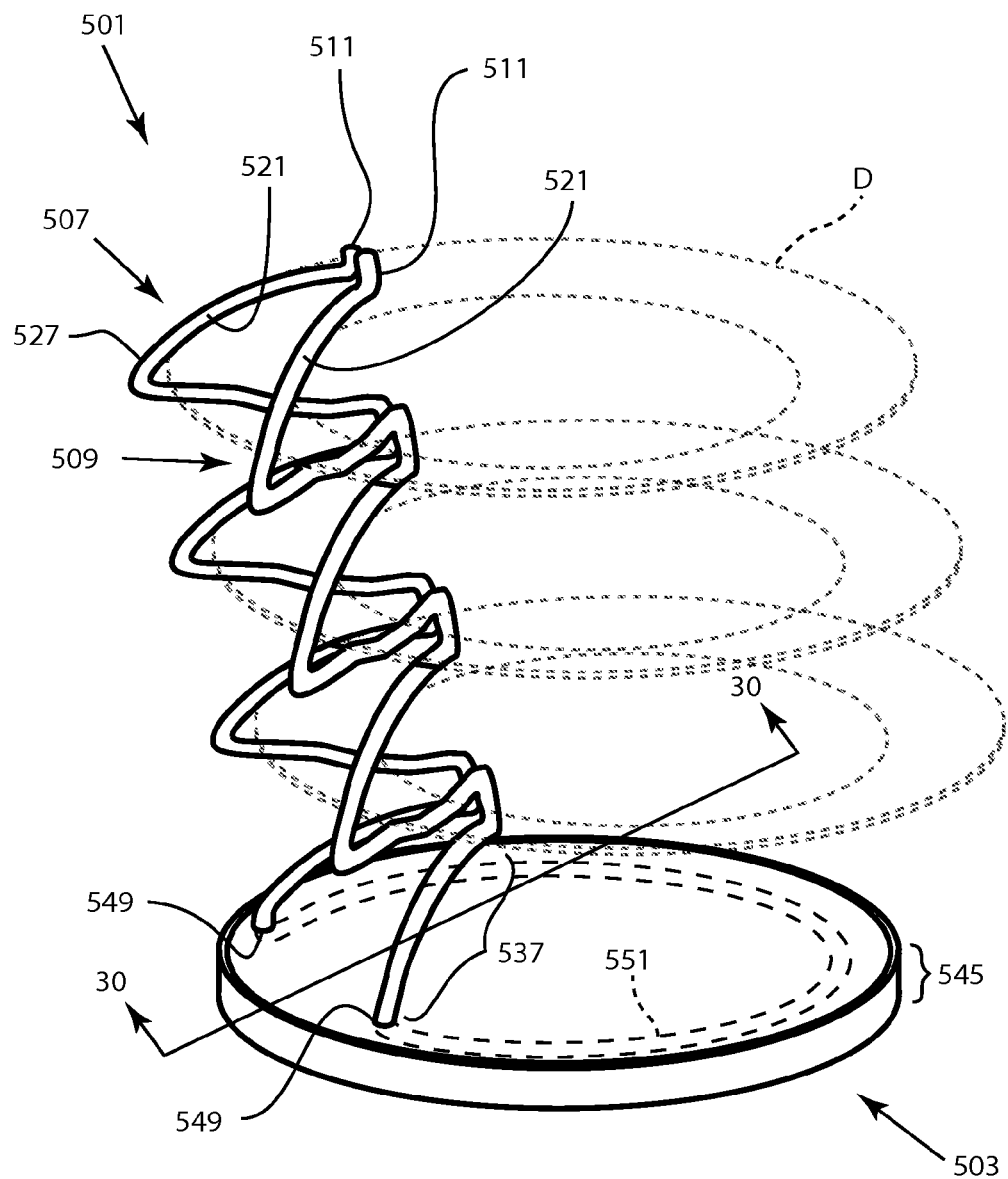
FIG. 29 is a view seen from the vantage point of FIG. 28, but with the fourth implementation of the inventive dish support assembly showing the elongate cylindrical shaped supports attached to the base in assembled position and shown supporting a series of plates or dishes (shown in broken line) in a parallel arrangement.

Referring to FIG. 29, a view seen from the same vantage point that FIG. 28 was seen, but with the inventive dish support 501 assembly showing the elongate cylindrical shaped supports 507 and 509 attached to the base 503, with the curved sections 537 seen ending at boundaries 549. Again, the shape, length, extended area and interconnectedness of the abbreviated vertical portions 531 to each other can be extensive within the thickness dimension 545 of the base 503 where base 503 is formed. As before, the angularity between the supports 507 and 509 can be set by controlling the shape of the insertion sections 539 and bores 541, or by providing extensions of the lower extent of the supports 507 and 509 within the base 503, or a connector, connection, or engaging spacer can be attached between opposite and adjacent abbreviated vertical portions 531. One possible interconnectivity route might include a continuous length of underlying material 517 as an integral loop 551 extending through the base 503 such that it may be more preferable to form integral loop 551 and supports 507 and 509 as a solid connected piece, either joined by welding or formed from one length of starting material. Where the integral loop 551 is large enough and has a significant footprint, it might displace the base 503. Plates or Dishes D are also shown in FIG. 29 as being supported by the shapes formed in the supports 507 and 509.

Figure 30:
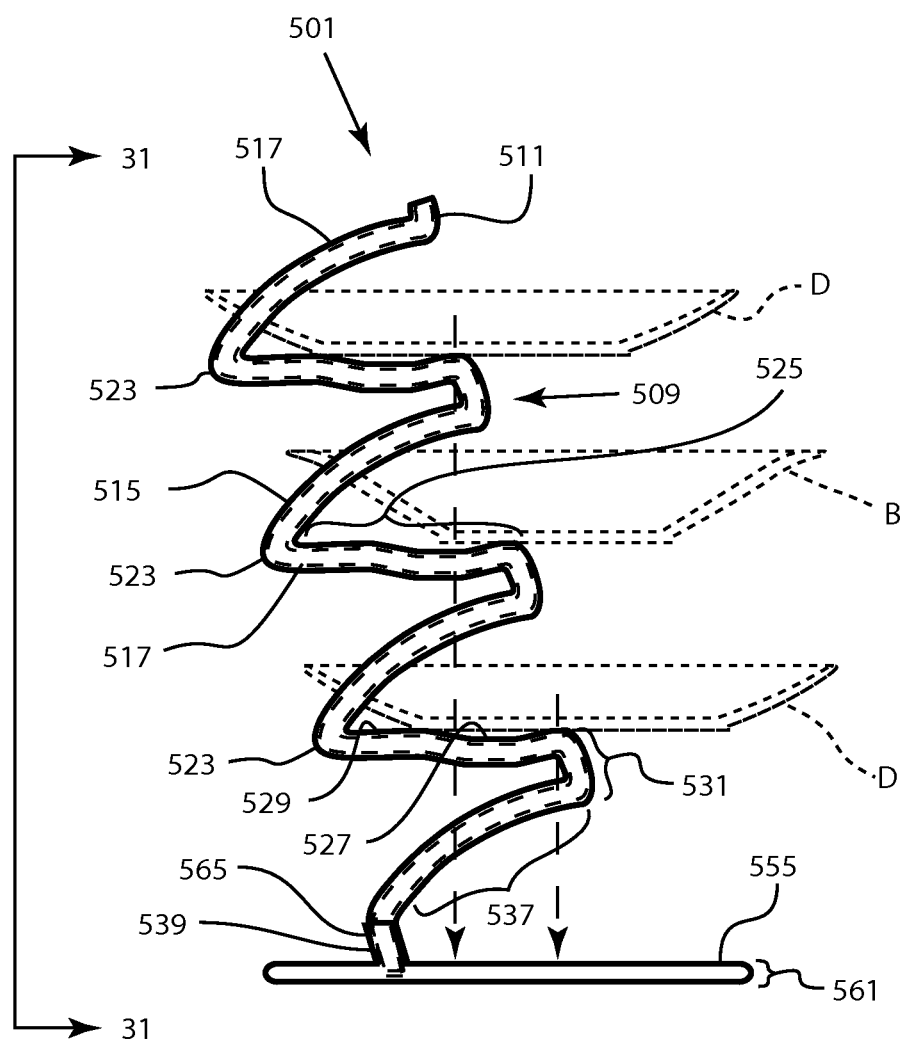
FIG. 30 is a plan view taken along line 30-30 of FIG. 29 and illustrates the parallel and lateral position of the supported plates as well as possible slight rearward tilt of the elongate cylindrical shaped supports, as well as an optional thinner base having a reinforcing boss into which the elongate cylindrical shaped supports may be supported.

Referring to FIG. 30, a plan view taken along line 30-30 of FIG. 29 sets the view of dish support assembly 501 from a lateral and somewhat vantage point illustrating supported plates or dishes D as well as possible slight rearward tilt of the elongate cylindrical shaped supports 507 and 509 which was also seen in FIG. 29, but not as definitively as it is seen in FIG. 30. An optional thinner base 555 is shown as having a reduced thickness dimension 561 and having a pair of reinforcing bosses 565 (only one of which is seen in FIG. 30) into which the angled insertion sections 539 pair of elongate cylindrical shaped supports 507 and 509 may be well supported, especially if the base 555 and reinforcing bosses 565 are made of a sufficiently strong metal. Note the slight angular tilt of the shaped supports 507 and 509 toward an outer extent of, and away from the center of base 555. This slight tilt, where the dishes D are all the same diameter and height, can provide slightly more visual exposure of the lower dishes D in the stack. Put another way, it will help to slightly mitigate the extent that a larger dish D can obscure the view of a dish D below it, even if all the dishes D are of a different height and diameter.

The base 555 may be formed as a one piece object with the reinforcing bosses 565 formed integrally or attached by welding and the like. Further, as is emphasized in FIG. 30, the angle of the bosses 565, and the angle and curvature of the curved section 537 can be selected for either greater strength or style. Put another way, the thickness and angle of departure of the bosses 565 and the curved section 537 can be adjusted. Moreover, the types of materials for the supports 507 and 509 and the bases 503 and 555 can vary widely. Thick materials will have greater strength, but thinner materials may have more aesthetic appeal.

Figure 31:
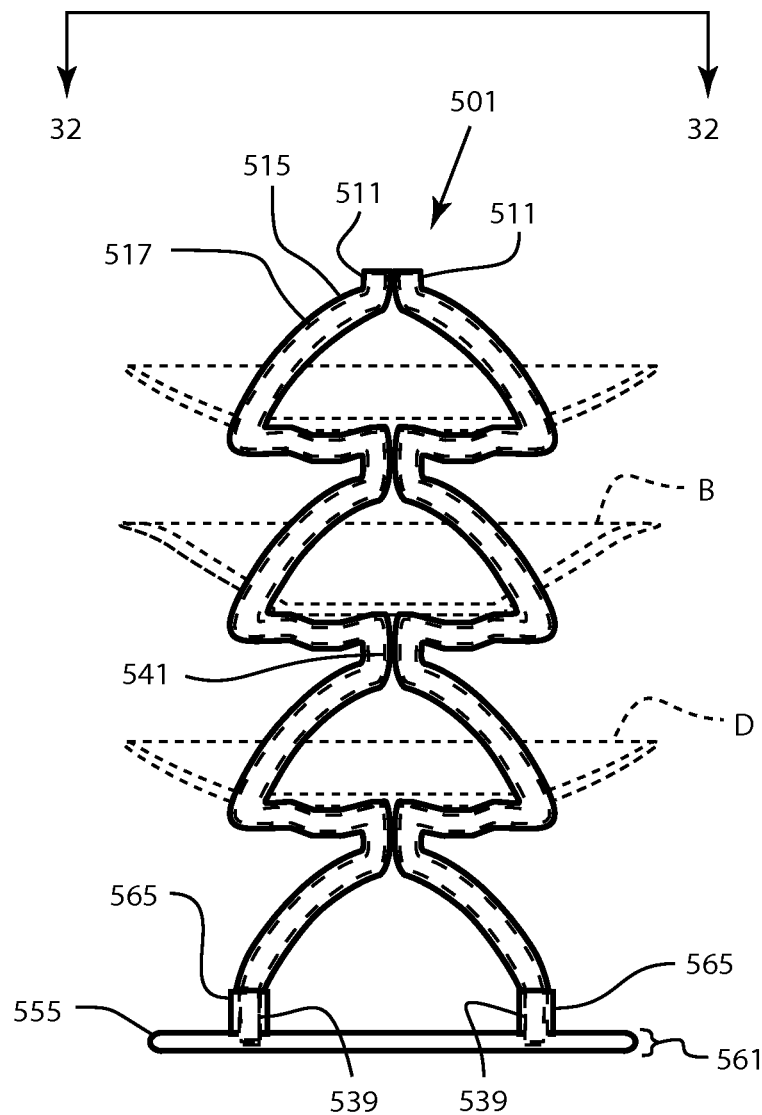
FIG. 31 is a plan view taken along line 31-31 of FIG. 30 and illustrates the bilateral symmetry from the viewpoint from behind the elongate cylindrical shaped supports.

Referring to FIG. 31, a plan view taken along line 31-31 of FIG. 30 illustrates the bilateral symmetry from the viewpoint from behind the elongate cylindrical shaped supports 507 and 509. The closeness of the abbreviated vertical portions 531 and of the uppermost short upwardly turned portion 511 suggests that in instances where it is not desirable to provide angular rotational restriction about the angled insertion sections 539 to prevent rotation of the pair of elongate cylindrical shaped supports 507 and 509, that a joining structure can be used to fix the rotational position of the elongate cylindrical shaped supports 507 and 509 with respect to each other. Such a rotational fixation structure could also be used as a sign, either for advertising or to indicate the type of food located on the dishes D of that particular dish support assembly 501. Even where a structure was not needed for fixation, the short upwardly turned portions 511 can be used to support a sign or other indicator (not shown).

Figure 32:
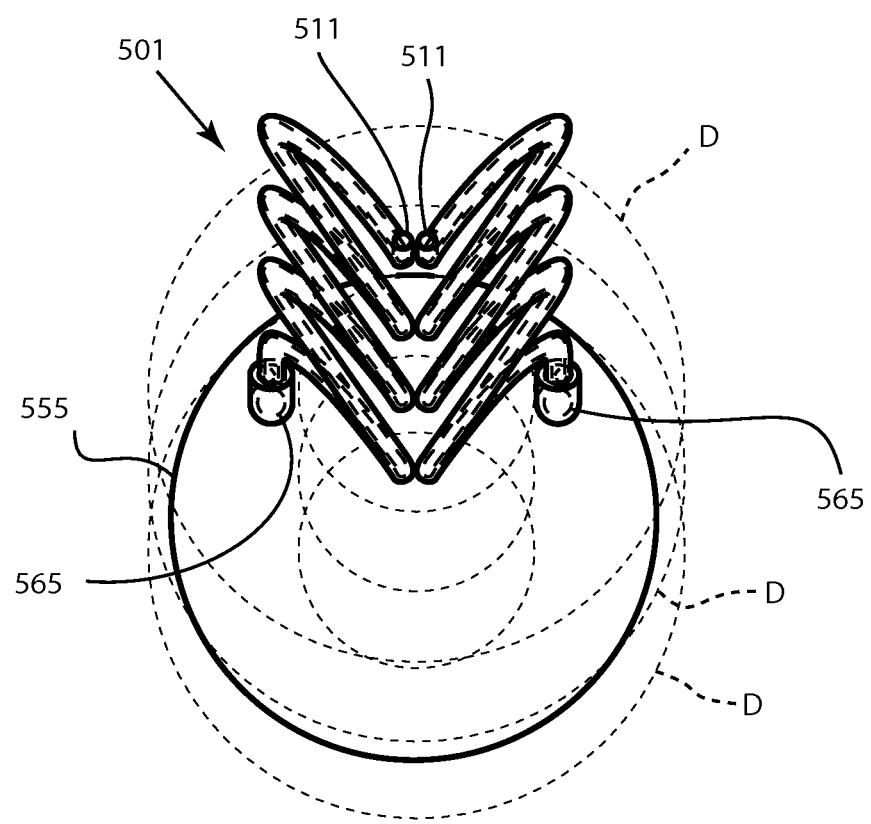
FIG. 32 is a top view taken along line 32-32 of FIG. 31, and looking down and into the pair of adjacent elongate cylindrical shaped supports and illustrating the tilt of the reinforcing boss into which the elongate cylindrical shaped supports may be supported.

Referring to FIG. 32, a top view taken along line 32-32 of FIG. 31, and looking down and over the pair of elongate cylindrical shaped supports 507 and 509 and the base 555, the circumferential outward tilt of the supports 507 and 509 are seen more clearly. The dishes D of FIG. 32 are seen has having diameters that are approximately equal to each other and illustrate a more even tiered appearance. Note the diameter of the base 555 may be smaller than the dishes D supported. Note also that the center of each dish D at each level of support can be seen as having centers that are offset with respect to each other. Note also that the center of support of each dish D overlies the boundary of the base 555 to give stability even if only one dish D is supported. The lowest supported dish D is the most forward (away from the bosses 565) but the highest supported dish has a center of gravity that is still forward of the boss 539.

Figure 33:
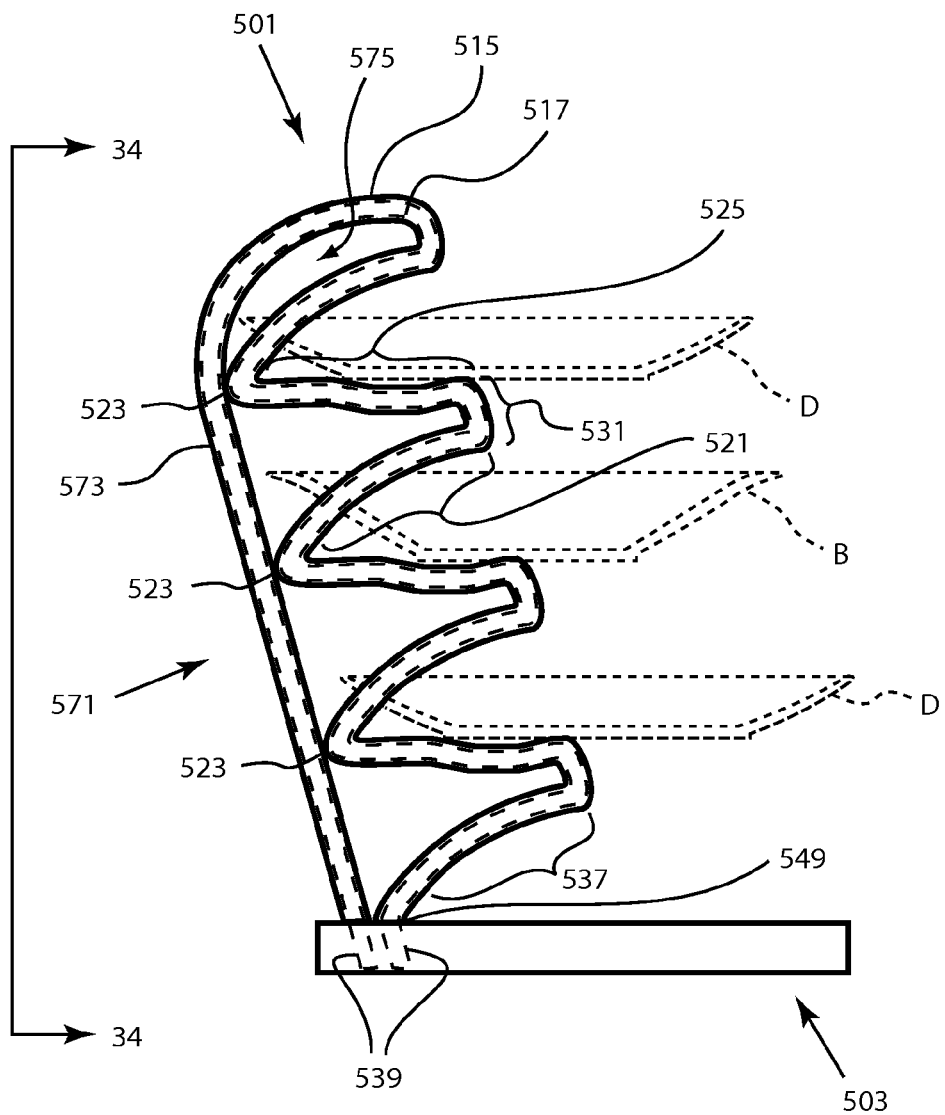
FIG. 33 is a plan view of an embodiment similar to the perspective of the embodiment seen in FIG. 30 and illustrates a doubling of the path of the elongate cylindrical shaped supports as an alternative for additional strength, stability, and style and for facilitation of formation of a handle at their upper ends.

Referring to FIG. 33, a plan view of an embodiment is show from a viewpoint similar to the view of the embodiment seen in FIG. 30. A pair of elongate cylindrical shaped supports of which only support 571 is seen, provides a doubling of material for the structure to support dishes D and a bowl B. A view looking into support 571 provides a look at its shape and shows somewhat of an extension of the upwardly turned portion 511 seen in FIGS. 28-32, with that extended length of material 573 looping up to form an open handle space 575 and then extending back along the plate support structures passing adjacent to each of the sharp angled turns 523 and then ending adjacent the curved sections 537 seen ending at boundaries 549 at the entry of base 503. Additional structural integrity is supplied by the support had by the material of the upper part of the handle space 575 by added suspension forces to the material forming the plate support structures (upper curved portion surface 521, sharp angled turn 523, & generally straighter portion 525), lateral support adjacent the sharp angled turns 523, and a common tie and rotational stability due to the adjacent portions of the underlying material 517 within the base 503. The configuration of FIG. 33 gives additional strength, or alternatively enables the use of a smaller effective diameter surface and/or outer elastomeric material 515 and underlying material 517 that a different, more slender look can be achieved. Further, if the underlying material 517 is welded at the locations of the sharp angled turn 523 before the material 515 is applied, each of the three plate support areas will be somewhat triangularly reinforced. All of these factors enable a more slender look from lesser diameter materials and enable a more slender look without compromising physical integrity of the support 501.

Figure 34:
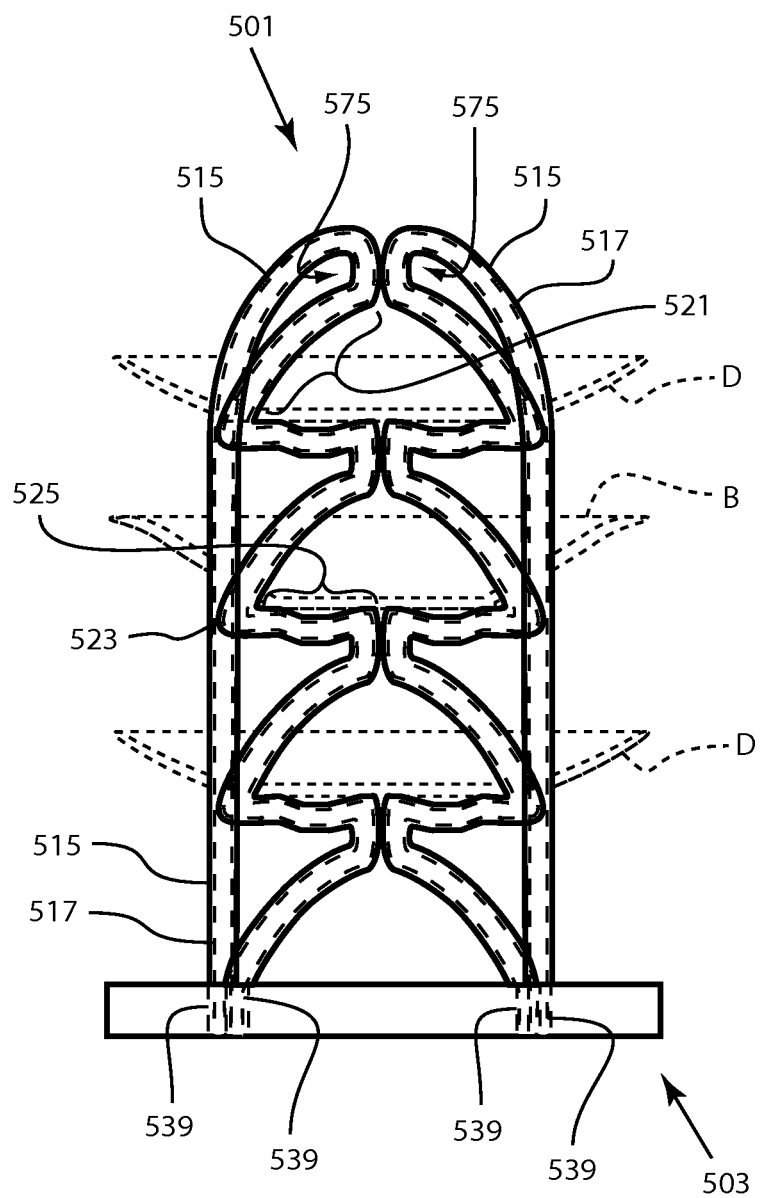
FIG. 34 is a plan view taken along line 34-34 of FIG. 33 and illustrates the bilateral symmetry from the viewpoint from behind the elongate cylindrical shaped supports and the perspective of a view at an angle with respect to the front plate support portions of the elongate cylindrical shaped supports and the rear generally linear elongate cylindrical shaped supports that may be optionally joined, or spaced apart from the front plate support portions.

Referring to FIG. 34, a plan view taken along line 34-34 of FIG. 33 illustrates a rear view closest to the extended length of material 573. The other elongate cylindrical support 577 is seen opposite the elongate cylindrical shaped support 571. The view of FIG. 34 emphasizes a bilateral symmetry and somewhat shows the points of adjacency of the sharp angled turn 523 with respect to the extended lengths of material 573. The view of FIGS. 34 and 31 emphasize how will the inventive dish assembly 501 evenly distributes the support of both dishes D and bowls B.

Figures 35, 36:
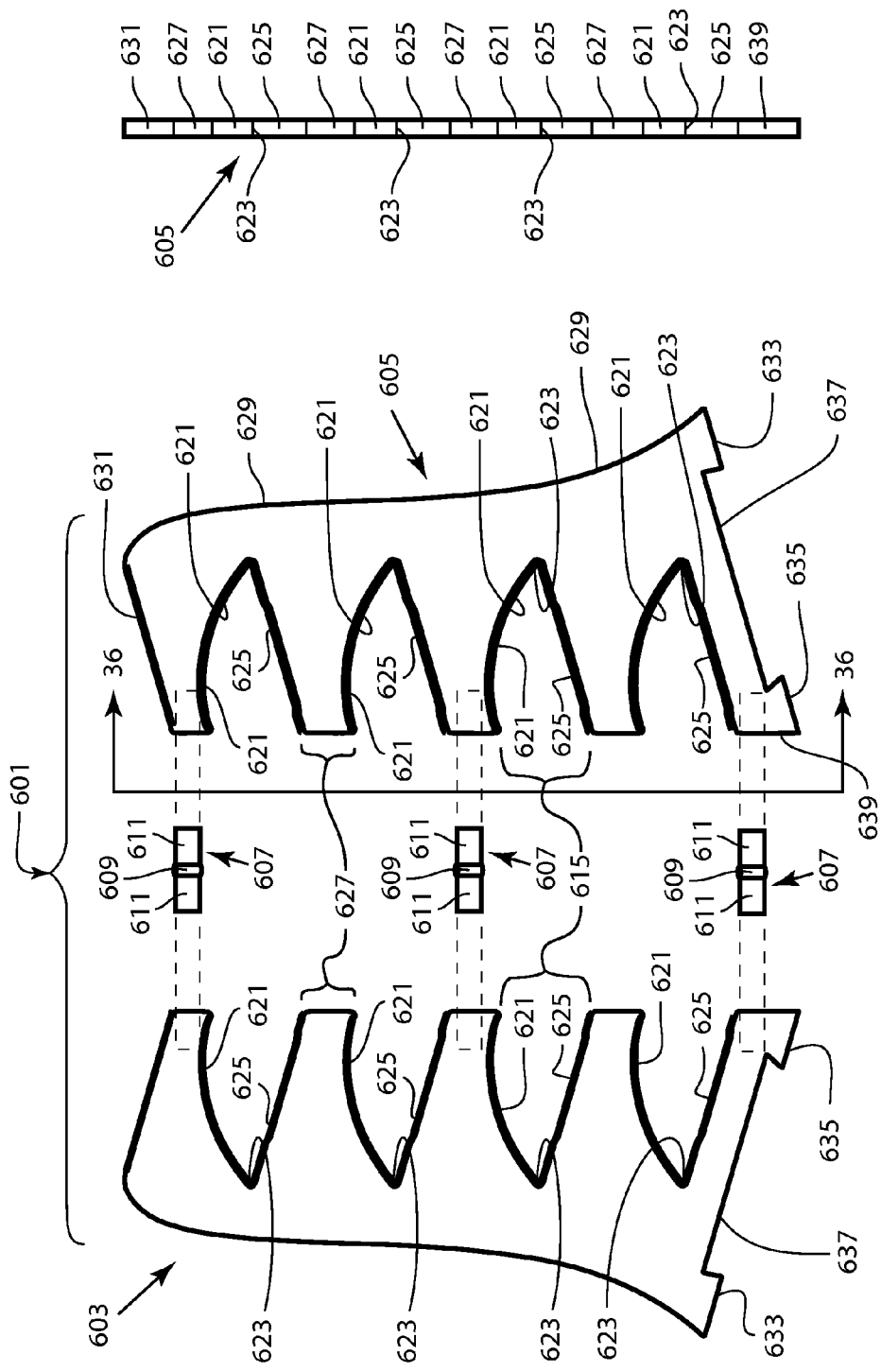
FIG. 35 is an exploded view of a fourth embodiment of the the inventive dish assembly having a first panel and second panel with the holding unit structures arranged in a progressively rearwardly orientation as they proceed vertically that simulates the tilt of FIGS. 28-34 and bilaterally exploded with respect to a series of vertically aligned hinges shown in alignment.
FIG. 36 is a view looking at the edge of the rightmost panel from a view taken along line 36-36 and which illustrates the thin profile of the second panel seen in FIG. 35.

FIG. 35 is an exploded view of a fourth embodiment of the the inventive dish assembly 601. A first panel 603 and second panel 605 are both shown tilted with respect to a series of joining structures such as hinges 607, with hinges 607 shown in vertical pivoting alignment. The use of hinges 607 will enable the first and second panels 603 and 605 to be folded flat and adjacent each other for quick deployment and storage. Structures which enable pivoting need not be used in order for the dish assembly 601 structure to function. First, other structures can be used to enable quick disassembly and flat storage, such as hooks, magnets, hook & loop fasteners, quick release fasteners and more. However, where it is desired to use a system in which the dish assembly 601 may be stored in its deployment position, it can be stacked either horizontally or vertically using a nested technique. Further, the size and capacity of the dish assembly 601 is such as might be used to support 4 objects, but it can be made taller and support more than 4 objects or smaller and able to support less objects. Size may be a factor in determining whether it is more desirable to have a fixed or stowable structure.

Achievement of the deployment orientation for a stowable structure can be set by angular limitation, guides, bases that dictate orientation and other structures. In one instance hinges 607 may be provided that are limited in their angle of hinged pivot in order to set a maximum angular displacement between the first panel 603 and second panel 605, and hinges 607 should be load bearing. Hinges 607 may include a common pivoting section 609 and a pair of attachment plates 611. The position of the first and second panels 603 and 605 and the hinges 607 is shown as if they where laid flat with attachment plates 611 lying parallel, and the first and second panels 603 and 605 lying flat in a position to laterally approach the attachment plates 611 of the hinges 607 for attachment. In reality, the hinges 607 may be angular limited so that the attachment plates 611 will be incapable of lying in the same plane, during normal use with the view and arrangement seen in FIG. 35 being impossible to achieve as a practical matter without disassembly of the hinges 607. Other mechanisms to limit the angular pivot of the first panel 603 with respect to the second panel 605 are possible.

A holding unit structure 615 is seen to include the upper curved portion surface 621, and a turn 623 which connects to a generally straighter portion 625 as described for the previous embodiments. As before, the holding unit structure 615 will preferably have a non-slip surface associated with it, either by attachment, dipping or spraying a coating onto part or all of the first and second panels 603 and 605 or other technique. A pair of adjacently located holding unit structure 615 angled with respect to each other forms a dish accommodation space. A series of the abbreviated vertical portions 627 lie between the holding unit structures 615 and also provide the closest points of adjacency for the first and second panels 601 and 603 in a deployed position, and the ideal location for interposed attachment of the hinges 607. Thus each panel's closest front edge are closer to each other and include the holding unit structures 615 separated by abbreviated vertical portions 627.

Also seen with respect to the first and second panels 603 and 605 are a curved rear edge 629, an upper generally straight edge 631 a rear foot projection 633, a front foot projection 635, and a cutout or slot 637 interposed between the rear foot projection 633 and front foot projection 635. It is understood that rear foot projection 633, front foot projection 635, & slot 637 are all structural options, and are shown to emphasize that foot projections 633 and 635 can be used for stable support of the panels, and to emphasize that the support of the first and second panels 603 and 605 can be had by support from another object or base (not shown in FIG. 35) In addition, the slot 637 may have any number of shapes, especially where the first and second panels 603 and 605 may either supported by or interfitting with other objects. A lowest one of the abbreviated vertical portions 627 is seen as a base front 639 which is in front of the material below the lowermost generally straighter portion 625 and in front of the front foot projection 635. Note that the series of the abbreviated vertical portions 627 may form an angle with respect to the lower extent of the a rear foot projection 633 and front foot projection 635 of about 16° (sixteen degrees) with the holding unit structures 615 not being individually tilted or inclined.

This is not to say that the holding unit structures 615 cannot be slightly tilted or inclined for other effects, but that generally the holding unit structures 615 are shown as being vertically linearly progressively staggered to place the top holding unit structures 615 closer to a center of gravity of the inventive dish assembly 601 than the bottom holding unit structures 615. In addition, dramatic effects can be achieved by including a more severe incline from vertical, including a wide horizontal separation of supported objects by any support structure, including inventive dish assembly 601. The angle of inclination can vary between about 0° (zero degrees) where the axis of pivot is vertical, to about 45° (forty-five degrees) where each supported object (not shown) might have its point of support generally separated vertically and horizontally by substantially the same amounts. As a result, it can be seen that each subsequent holding unit structure 615 is set farther back with respect to the next most adjacent holding unit structure 615 beneath it so that any support at a higher level one of the holding unit structures 615 will be supported closer to a vertical center of the dish assembly 601 taken with respect to a direction orthogonal to a line between rear foot projection 633 and front foot projection 635.

Referring to FIG. 36, a view looking at the edge of the rightmost panel 605 from a view taken along line 36-36 illustrates the thin profile of the second panel 605 seen in FIG. 35. The segmented structures of FIG. 36 are seen at an angle corresponding to the view of FIG. 35, or else the generally straighter portion 625 would not be as observable.

Referring to FIG. 37, a side view of the assembled dish assembly 601 whose component parts were seen in FIGS. 35 & 36, illustrates a view looking perpendicular to a middle plane between the first and second panels 603 and 605 as the dish assembly 601 is shown in a deployed position. Dish assembly 601 is viewed such that only the first panel 603 is visible, and is shown with examples of various bowls B, dishes D and large bowls LB shown in broken line format in a position supported by the assembled dish assembly 601. The middle plane is somewhat represented by line 38-38, and the series of the abbreviated vertical portions 627 are aligned to indicate the axis of pivot of the first panel 603 and second panel 605 to each other and is seen to be declined from the vertical by about 16° (sixteen degrees). The view of FIG. 37 graphically illustrates a stepped back holding unit structure will allow for easy reach and manipulation of food items on (and in) the various bowls B, dishes D and large bowls LB while held on the dish assembly 601. Extension of the generally straighter portion 625 of the dish assembly 601. structure significantly further than the upper curved portion surface 621 enables a greater variety of dishes D, bowls B and large bowls LB with wider rims that can be held safely in a cantilevered manner.

Further, the progressive further rearward location of each successive holding unit structure 615 helps distribute the center of gravity of dishes D held in the dish assembly 601 over a larger area, allowing for a smaller base footprint. Dish assembly 601 has efficient stowage characteristics and can tolerate support even where only upper ones of the holding unit structure 615 are loaded with dishes D. Dish assembly 601 accomplishes this advantage in a form that may or may not include other base structures (not shown in FIGS. 35-37).

Referring to FIG. 38, a front plan view of the assembled dish assembly 601 of FIGS. 35-37 is shown. In FIG. 38 the view is looking in parallel to the midline plane generally represented in line 38-38. FIG. 38 illustrates the forward structure to which various bowls B and dishes D shown in broken line format approach on loading.

Referring to FIG. 39, a top view looking down onto the assembled dish assembly of FIGS. 35-38 and particularly looking down along line 39-39 of FIG. 38 illustrates the tilted corner, similar to a pyramidal section, formed by the adjacent series of the abbreviated vertical portions 627 seen in FIG. 35. FIG. 39 is seen without the various dishes and plates for greater clarity. It should be noted that an angle between the first panel 603 and second panel 605 may preferably be about 60° (sixty degrees). a range of possible angles from about 40° (forty degrees) to about 80° (eighty degrees) is possible.

Referring to FIG. 40, a side view of the assembled dish assembly 601 similar to that seen in FIG. 37 is shown. However, the assembled dish assembly 601 is shown engaged with a guide and support platform 645 which acts both to further reinforces a set angle of the first and second panels 603 and 605 with respect to each other, as well as the overall stability and vertical support of the assembled dish assembly 601 by providing an expanded base so that the dish assembly 601 can be better supported from all sides. Consequently, although the guide and support platform 645 will be shown as having a number of features which interfit with physical details of the dish assembly 601 shown, it is understood that any structure which can attach to the first and second panel 603 and 605 by surrounding structure, gluing, magnetic force, threaded fastener interconnection, and much more, that the idea is the provision of greater stability and that any given guide and support platform 645 may have vastly different type and sizes of stability and attachment components.

Guide and support platform 645 is seen as having a planar shape with a set of feet 647. Guide and support platform 645 may ideally have a vertical height that engages cutout or slot 637 to thus bear all of the support force of the first and second panels 603 and 605 and items supported by first and second panels 603 and 605. Much of the details of the size and shape of the guide and support platform 645 may also be determined by the height and number of vertical objects the dish assembly 601 is intended to support. Various supported objects are shown in broken line format, including large dishes LD, and large bowls LB.

Referring to FIG. 41 is a side view of the a guide and support platform 645 seen in FIG. 40 illustrates the low profile of the a guide and support platform standing alone. At a rear portion of the guide and support platform 645, a rear notch 651 is seen, while at a front portion of the guide and support platform 645 a support leg portion 653 is seen, the extent of which are best understood after viewing later Figs. Referring to FIG. 42, a top view of the guide and support platform 645 seen in FIGS. 40 & 41 illustrates bilateral symmetry of the structural features. In addition, a central aperture 655 is seen, as is a rear curved portion 657. Central aperture 655 is optional, but will, if present, assist in grasping for carriage or removal, and for storage where the guide and support platforms 645 may use the central aperture for alignment and stacking around a projection. The guide and support platform 645 utilizes rear notches 651 to engage the short vertical extent of the rear foot projections 633 adjacent the cutout or slot 637 to set the angular pivotal spread of the panels 603 and 605 with respect to each other. Likewise, the space between the support leg portions 653 are used to help contain and center the front foot projections 635 to insure even fit of the rear foot projections 633 into the cutouts or slots 637.

Referring to FIG. 43, a top view looking down onto the assembled dish assembly 601 of FIGS. 35-40 and particularly looking down along line 43-43 of FIG. 40 illustrates the tilted corner, similar to a pyrimidal section, formed by the adjacent series of the abbreviated vertical portions. The assembled dish assembly 601 is seen overlying the guide and support platform 645 illustrating its stabilizing support. The front foot projection 635 are seen as centered and resting between the support leg portions 653 of the guide and support platform 645.

Figures 44, 45:
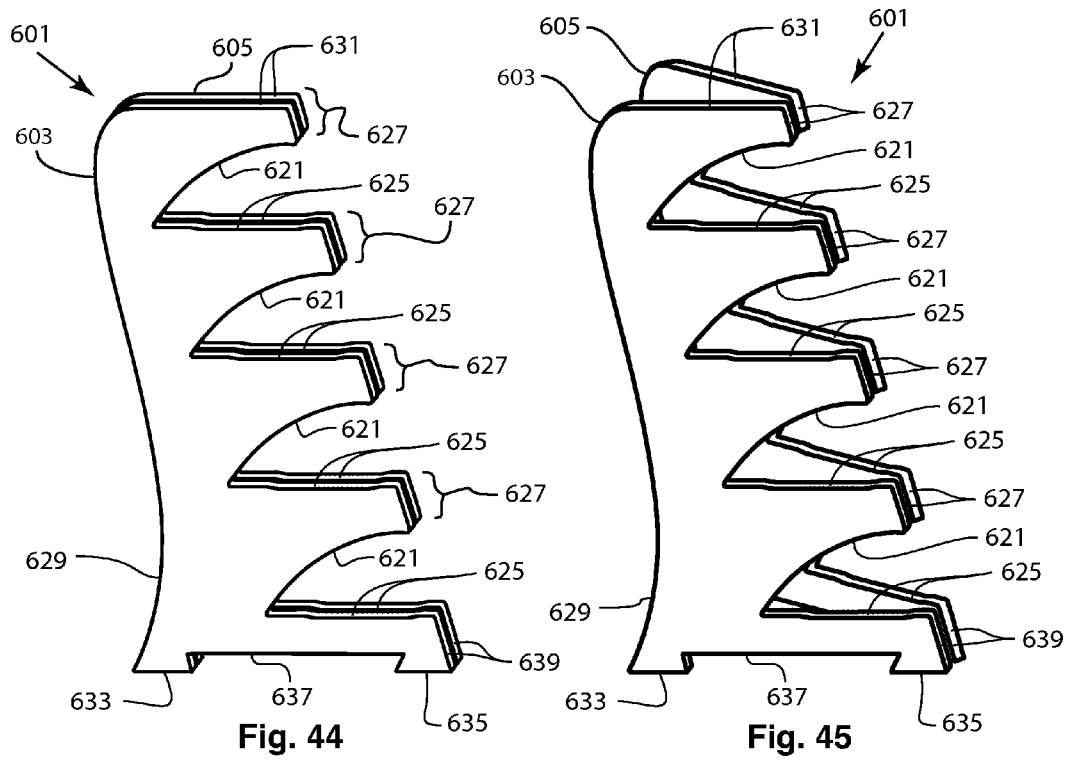
FIG. 44 is an upper perspective view of the assembled dish assembly of FIGS. 35-39 and shown in a folded position either ready to be packed away or in a position just about to be deployed on a support surface.
FIG. 45 is an upper perspective view of the assembled dish assembly most similar to that seen in FIG. 44 and shown in a deployed position ready to support bowls, dishes and large bowls seen in FIG. 37, and ready for support on a surface.
Figure 46:
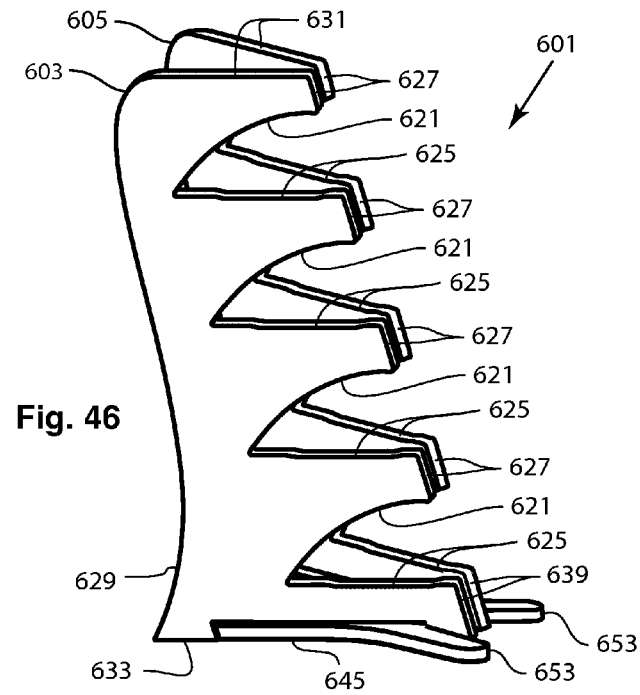
FIG. 46 is an upper perspective view of the assembled dish assembly most similar to that seen in FIG. 45 and shown in a deployed position ready to support bowls, dishes and large bowls seen in FIG. 37, but supported on a surface with the assistance of a guide and support platform seen in FIGS. 40-43.

Referring to FIG. 44, an upper perspective view of the assembled dish assembly 601 of FIGS. 35-39 and shown in a folded position either ready to be packed away or in a position just about to be deployed on a support surface. Referring to FIG. 45, an upper perspective view of the assembled dish assembly 601 most similar to that seen in FIG. 44 and shown in a deployed position ready to support bowls B, dishes D, and large bowls LB for example, as were seen in FIG. 37, and ready for support on a surface such as a table or support (not shown). Referring to FIG. 46, an upper perspective view of the assembled dish assembly 601 most similar to that seen in FIG. 45, is shown in a deployed position ready to support bowls B, dishes D, and large bowls LB for example, as were seen in FIG. 37, but that would now be supported or supportable on a surface with the assistance of a guide and support platform 645 seen in FIGS. 40-43.

Referring to FIG. 47, an upper perspective exploded view of the assembled dish assembly 601 most similar to the perspective of FIG. 45 is shown. FIG. 47 illustrates the angular tilt of both the assembled dish assembly 601 the hinges 607 when the assembled dish assembly 601 is supported on a generally horizontal surface. The broken line projections that lead onto the series of the abbreviated vertical portions 627 illustrate an angled projection of the attachment plates 611 such that the vertical height of the abbreviated vertical portions 627 of the assembled dish assembly 601 are sufficient to accommodate the vertical height of the attachment plates 611. Referring to FIG. 46, an upper perspective view of the guide and support platform 645 seen in FIGS. 40-43 & 46 gives a better perception of the physical compactness and ease of storability of the support platform 645.

In this manner a conveniently fabricated and easily assembled structure, which can range from a panel combination to a wire frame, can be easily obtained to provide various levels of dish loading capacity both for transport or as a stationary dish support. The inexpensive nature, simplicity and convenience of this dish handling arrangement can therefore be useful in commercial setting, as an adjunct assisting the sale of dish ensembles or simply as a storage mechanism in a home.

Obviously many modifications and variations of the instant invention can be effected without departing from the spirit of the teachings herein. It is therefore intended that the scope of the invention be determined solely by the claims appended hereto.

What is claimed:

1. A collapsible dish assembly useful to support in a substantially horizontal cantilevered manner, a plurality of dishes, comprising:
   a first panel, having a first plurality of holding unit structures each having an upper curved portion substantially opposite a horizontal generally straighter portion; and
   a second panel, having a second plurality of holding unit structures each having an upper curved portion substantially opposite a horizontal generally straighter portion, the first panel fixed in relationship to the second panel so that the first plurality of holding unit structures corresponds to and is angled toward the second plurality of holding unit structures in a manner to support a plurality of dishes in a horizontally cantilevered manner, wherein the first and second panels form a pyramidal section relationship when deployed.

2. The assembly according to claim 1, wherein each of the holding unit structures of the first and second plurality of holding unit structures includes a non-slip surface for engaging dishes, said non-slip surface is applied to at least one of said horizontal generally straighter portion and said upper curved portion.

3. The assembly according to claim 1, wherein the first and second panels each include a front foot projection spaced apart from a rear foot projection.

4. The assembly according to claim 3, wherein upon deployment the front foot projections of the first and second panels remain in close proximity to each other while the rear foot projections of the first and second panels are separated to collectively form a three point bearing support arrangement.

5. The dish assembly as recited in claim 1 wherein each of the first and second panels each have a rear edge and a front edge and wherein the first and second panels first and second plurality of holding unit structures are more closely adjacent the front edge than the rear edge and wherein each of the first and second panels has a front edge series of a first and second plurality of abbreviated portions separating each of the first and second plurality of holding unit structures on each of the first and second panels, respectively and wherein the at least one hinge is attached adjacent associated ones of the first and second plurality of abbreviated portions.

6. The dish assembly as recited in claim 1 wherein pairs of the first and second plurality of holding unit structures are associated with each other and where each pair has an opening for accepting and supporting the plurality of dishes in the horizontally cantilevered manner and wherein an associated pair of openings of a next higher successively located pair of the holding unit structures are located behind an associated pair of openings of the pair of holding unit structures that are located below it.

7. The dish assembly as recited in claim 1 wherein the first and second panels have upper portions opposite lower portions and wherein the lower portions are at an angle with respect to each other relative to a horizontal surface upon which the first and second panels are supported when the dish assembly is in a deployed position.

8. The dish assembly as recited in claim 7 wherein upper portions of the first and second panels are inclined toward each other when in a deployed position.

9. The dish assembly as recited in claim 8 wherein the first panel has a first plane and wherein the second panel has a second plane and wherein the planes intersect along a reclined line of intersection to form a pyramidal section.

10. A collapsible dish assembly useful to support in a substantially horizontal cantilevered manner, a plurality of dishes, comprising:
a first panel, having a rear edge and a front edge series of a first plurality of abbreviated vertical portions separating a first plurality of holding unit structures;
a second panel, having a rear edge and a front edge series of a second plurality of abbreviated vertical portions separating a second plurality of holding unit structures, the first panel fixed in relationship to the second panel so that the first plurality of holding unit structures correspond to the second plurality of holding unit structures in a manner to support a plurality of dishes; and
a guide and support platform having a rear portion for fitting between rear foot projections of the first and second panels and a front portion for at least partially surrounding front foot projections of the first and second panels in order to assist in setting a fixed relationship of the first panel with respect to the second panel.

11. A dish assembly useful to support in a substantially horizontal cantilevered manner, a plurality of dishes, comprising:
a first panel, a first plurality of holding unit structures each having an upper curved portion substantially opposite a horizontal generally straighter portion;
a second panel, a second plurality of holding unit structures each having an upper curved portion substantially opposite a horizontal generally straighter portion, each of the upper curved portions adjacently meets each of the horizontal generally straighter portions of the first and second panels at an angle of less than ninety degrees, the first plurality of the holding unit structures dimensionally corresponding to the second plurality of holding unit structures, and wherein the first panel is located relative to the second panel such that the first plurality of holding unit structures corresponds to the second plurality of holding unit structures, when in a deployed position to support in a horizontally cantilevered manner, a plurality of dishes.

12. A collapsible dish assembly useful to support in a substantially horizontal cantilevered manner, a plurality of dishes, comprising:
a first panel, having a first plurality of holding unit structures each having an upper curved portion substantially opposite a horizontal generally straighter portion; and
a second panel, having a second plurality of holding unit structures each having an upper curved portion substantially opposite a horizontal generally straighter portion, the first panel fixed in relationship to the second panel so that the first plurality of holding unit structures corresponds to and is angled toward the second plurality of holding unit structures in a manner to support a plurality of dishes in a horizontally cantilevered manner, wherein the first panel is fixed in relationship to the second panel with at least one hinge to enable the first and second panels to pivot between a deployed and a storage position with respect to each other.

13. The assembly according to claim 12, wherein each of the first and second panels each have a rear edge and a front edge and wherein the at least one hinge is attached more closely adjacent the front edges than the rear edges of the first and second panel, respectively.

14. The assembly according to claim 13, wherein the at least one hinge is a plurality of hinges.

15. The dish assembly according to claim 13 wherein the front edge of each of the first and second panels is periodically interrupted by each of the first and second plurality of holding unit structures, respectively.

16. The dish assembly according to claim 15 wherein the periodically interrupted front edge of each of the first and second panels is reclined with respect to the dish assembly when the deployed position.

\* \* \* \* \*